United States Patent
Ribo

(10) Patent No.: US 10,015,922 B2
(45) Date of Patent: Jul. 10, 2018

(54) DEVICE FOR HITCHING A TOOL, SUCH AS AN AGRICULTURAL TOOL, ONTO A HAULING SYSTEM OF A VEHICLE SUCH AS AN AGRICULTURAL TRACTOR

(71) Applicant: Tracto-Lock, Verdun en Lauragais (FR)

(72) Inventor: Romain Ribo, Verdun en Lauragais (FR)

(73) Assignee: TRACTO-LOCK, Verdun en Lauragais (FR)

( * ) Notice: Subject to any disclaimer, the term of this patent is extended or adjusted under 35 U.S.C. 154(b) by 24 days.

(21) Appl. No.: 15/122,547

(22) PCT Filed: Feb. 20, 2015

(86) PCT No.: PCT/FR2015/000037
§ 371 (c)(1),
(2) Date: Aug. 30, 2016

(87) PCT Pub. No.: WO2015/132481
PCT Pub. Date: Sep. 11, 2015

(65) Prior Publication Data
US 2017/0071121 A1 Mar. 16, 2017

(30) Foreign Application Priority Data
Mar. 3, 2014 (FR) ..................... 14 00525

(51) Int. Cl.
*A01B 59/06* (2006.01)
*A01B 71/06* (2006.01)

(52) U.S. Cl.
CPC .......... *A01B 59/062* (2013.01); *A01B 71/063* (2013.01)

(58) Field of Classification Search
CPC ............................ A01B 71/063; A01B 59/062
See application file for complete search history.

(56) References Cited

U.S. PATENT DOCUMENTS 936,708 A 10/1909 Felts
3,432,184 A * 3/1969 Tweedy ............... A01B 59/004
172/272

(Continued)

FOREIGN PATENT DOCUMENTS

AT 6440 1/1902
AT 379 048 3/1983

(Continued)

OTHER PUBLICATIONS

WIPO, Official Search Report of PCT/FR15/000037, dated Jun. 16, 2015.

*Primary Examiner* — Darlene P Condra
(74) *Attorney, Agent, or Firm* — Orrick, Herrington & Sutcliffe LLP; Joseph A. Calvaruso

(57) ABSTRACT

The invention relates to a hitching device including: a hitched frame mounted onto a tool, such as an agricultural tool; a hitching frame mounted onto a hauling system of a vehicle, such as an agricultural tractor, provided with a power take-off; and transmission means comprising coupling members that are suitable for being moved between a released position and an engaged position and are mounted onto the frames such as to be translatable along a vertical axis (z) and freely rotatable about a so-called "transverse" axis (y). Moreover, a prepositioning means is suitable for keeping, in the released position thereof, both coupling members in a predetermined position along the vertical axis (z) and for enabling, in the engaged position, the displacement of said coupling members, coupled along the vertical axis (z), and tilting of the latter about the transverse axis (y).

22 Claims, 17 Drawing Sheets

(56) References Cited

U.S. PATENT DOCUMENTS

Figure 10:
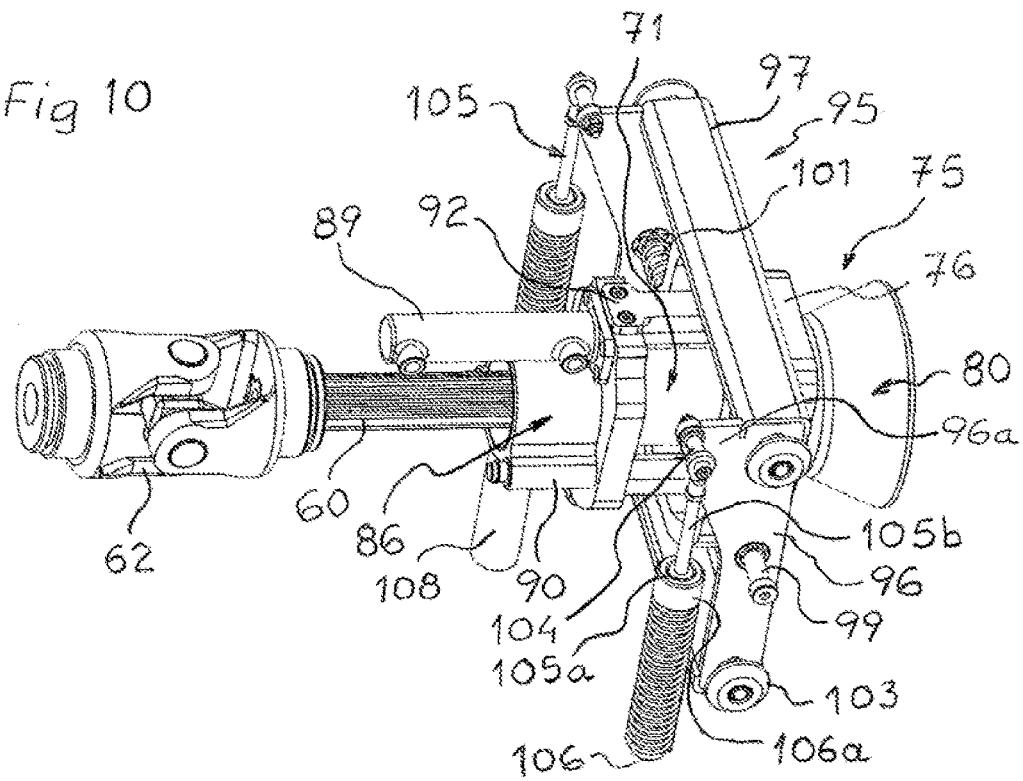

| | | | | | |
|---|---|---|---|---|---|
| 4,015,855 | A | * | 4/1977 | Murray | B60D 1/02 |
| | | | | | 172/248 |
| 4,431,207 | A | * | 2/1984 | Langenfeld | B60D 1/02 |
| | | | | | 172/248 |
| 5,950,735 | A | * | 9/1999 | Godbersen | A01B 59/062 |
| | | | | | 172/439 |
| 6,321,851 | B1 | * | 11/2001 | Weiss | A01B 59/062 |
| | | | | | 172/444 |
| 7,862,068 | B2 | * | 1/2011 | Schlesser | A01B 59/042 |
| | | | | | 180/53.3 |
| 2008/0115983 | A1 | * | 5/2008 | Priepke | A01B 71/063 |
| | | | | | 180/53.3 |
| 2008/0142231 | A1 | * | 6/2008 | Priepke | A01B 59/006 |
| | | | | | 172/1 |

FOREIGN PATENT DOCUMENTS

| | | |
|---|---|---|
| DE | 262162 | 7/1913 |
| DE | 31 40 917 | 6/1983 |
| DE | 36 12 322 | 10/1987 |
| DE | 41 32 889 | 4/1992 |
| EP | 0 186 384 | 7/1986 |
| EP | 0 197 026 | 7/1990 |
| EP | 1 500 321 | 1/2005 |
| EP | 1 637 024 | 3/2006 |
| EP | 1 932 411 | 4/2010 |
| EP | 2 389 793 | 11/2011 |
| FR | 2 340 675 | 2/1976 |
| FR | 2 550 910 | 8/1983 |
| FR | 2 604 327 | 9/1987 |
| FR | 2 710 490 | 9/1994 |
| GB | 2 408 669 | 6/2005 |
| WO | WO 2004/077928 | 9/2004 |

* cited by examiner

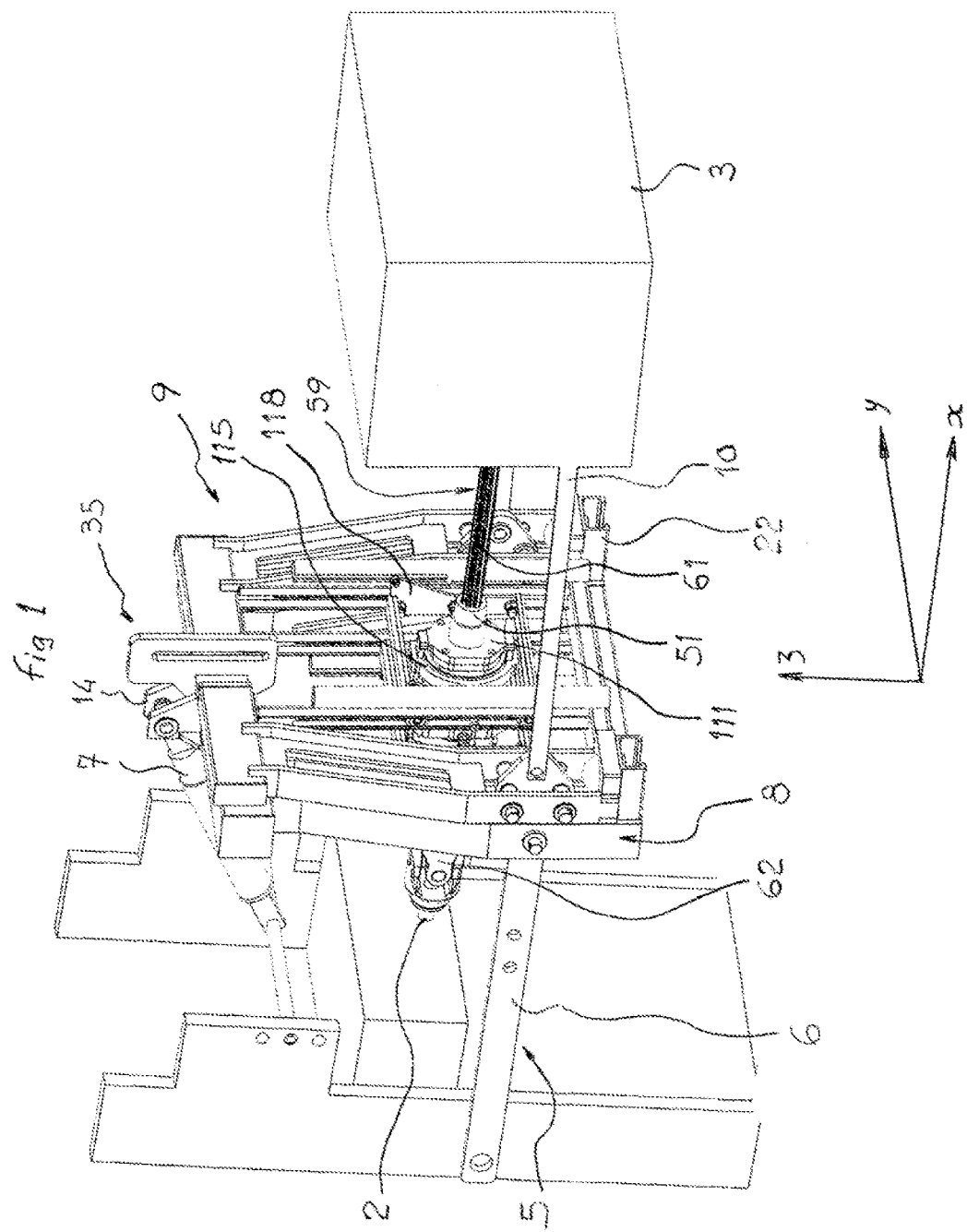

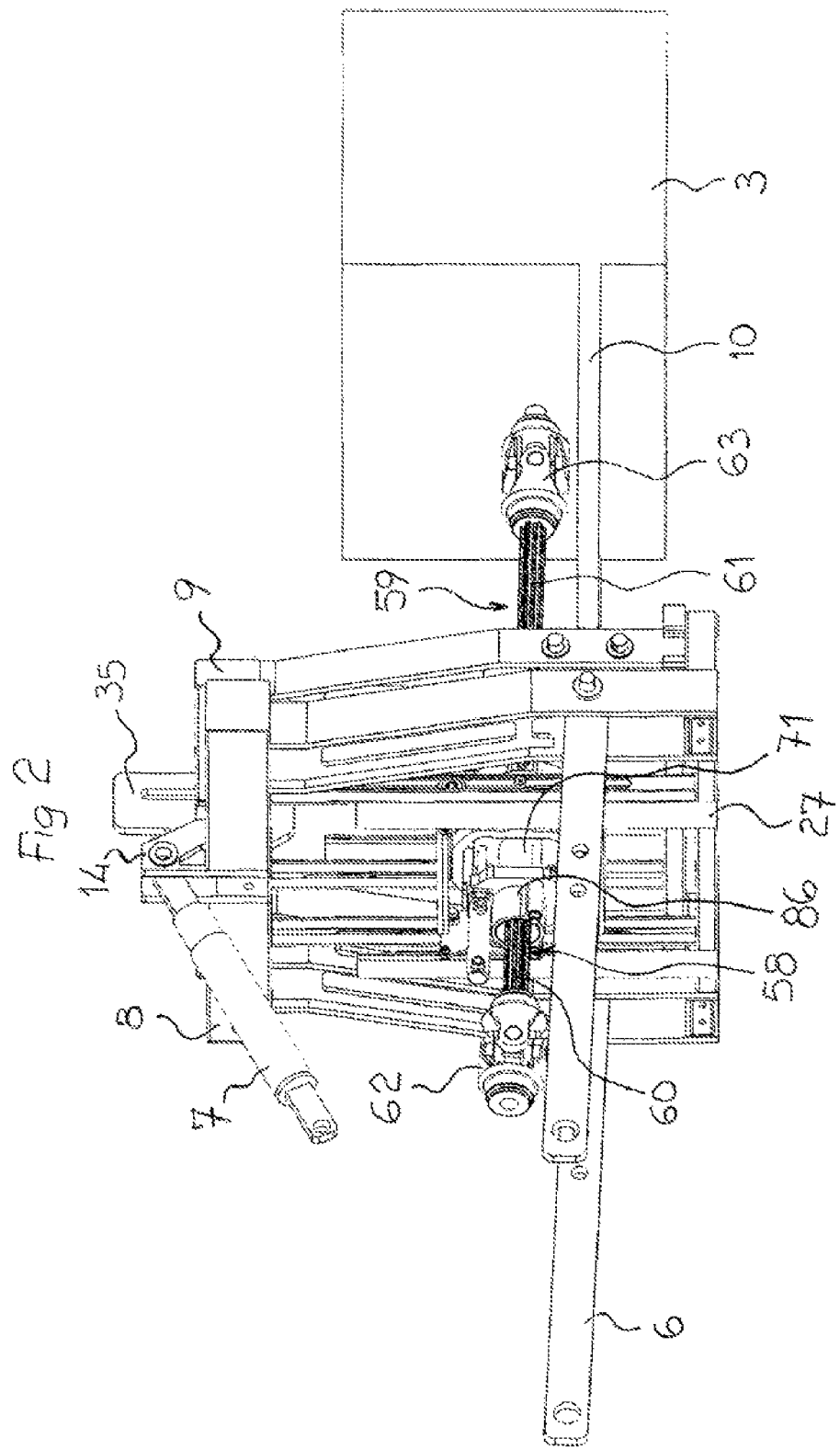

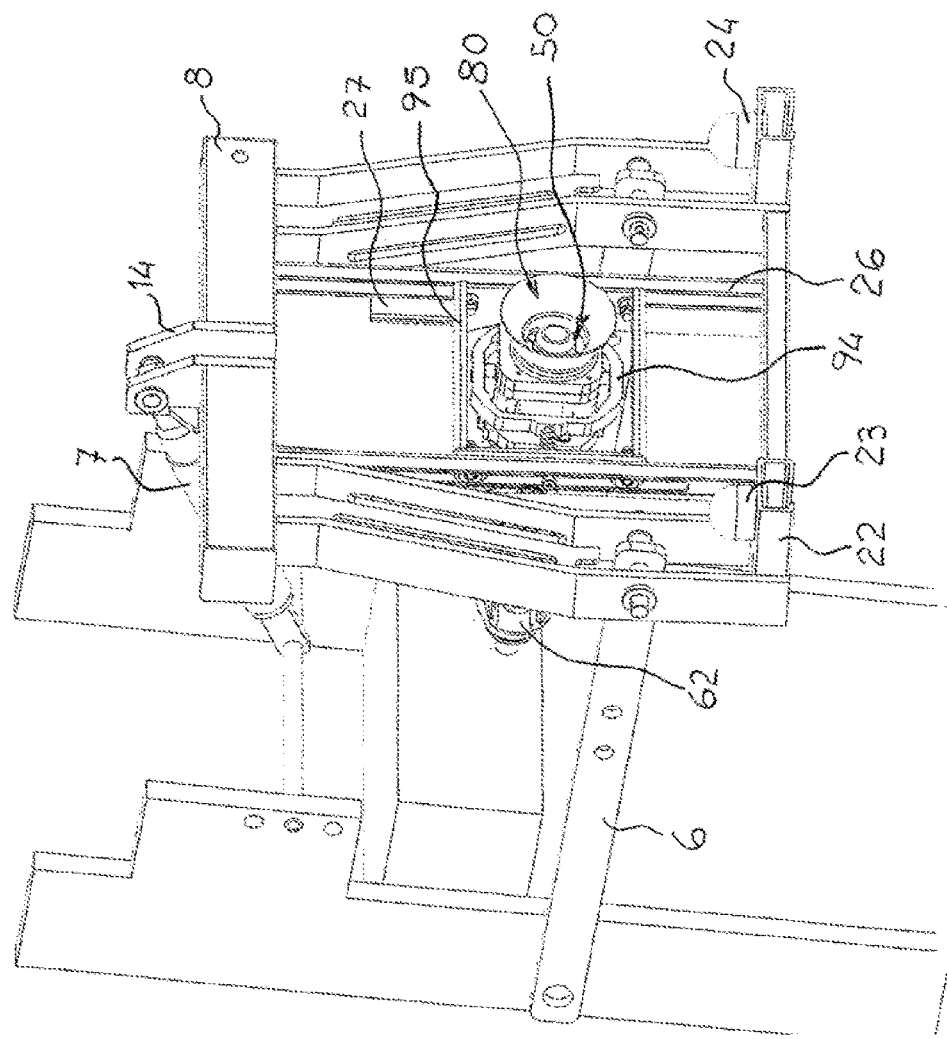

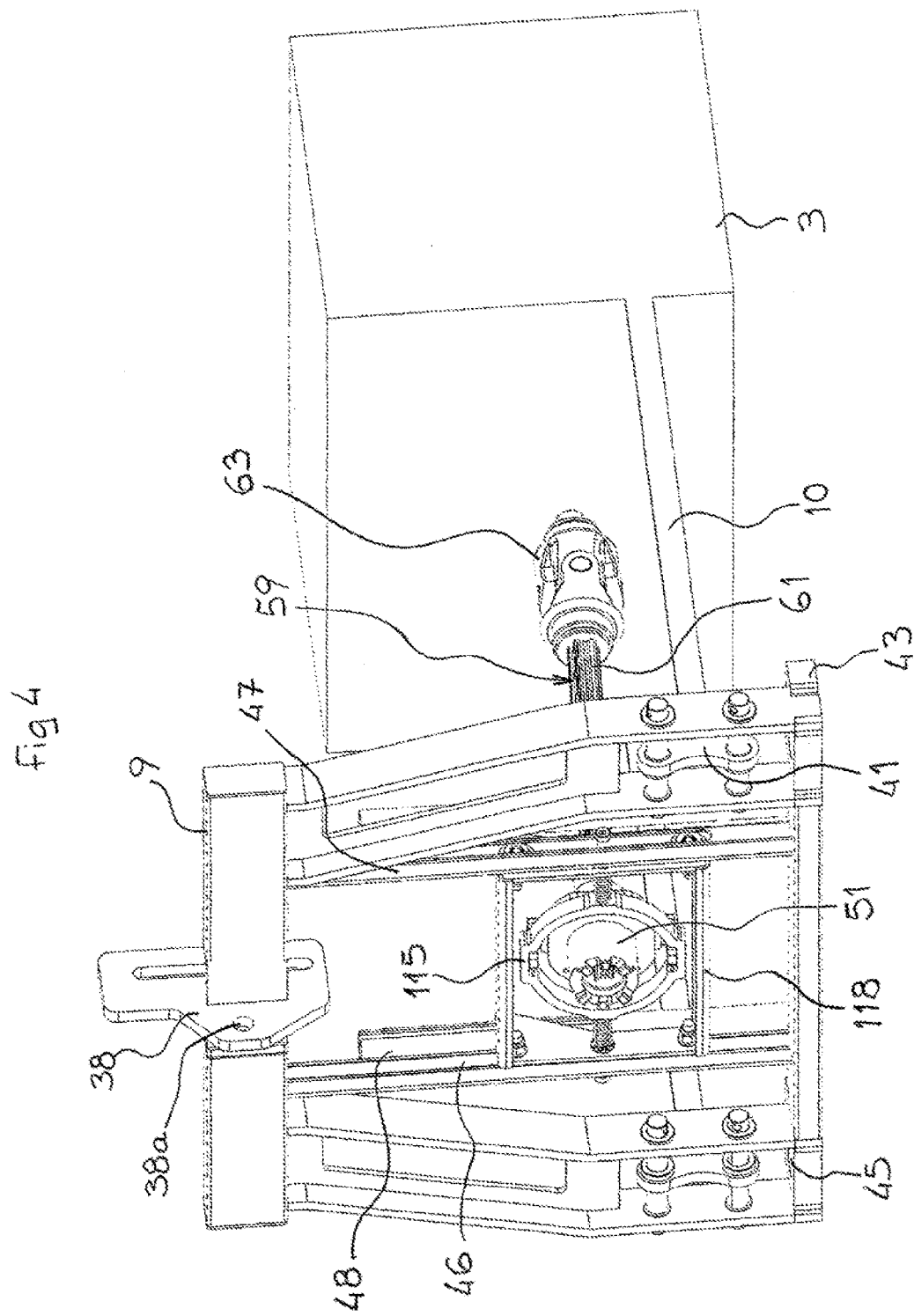

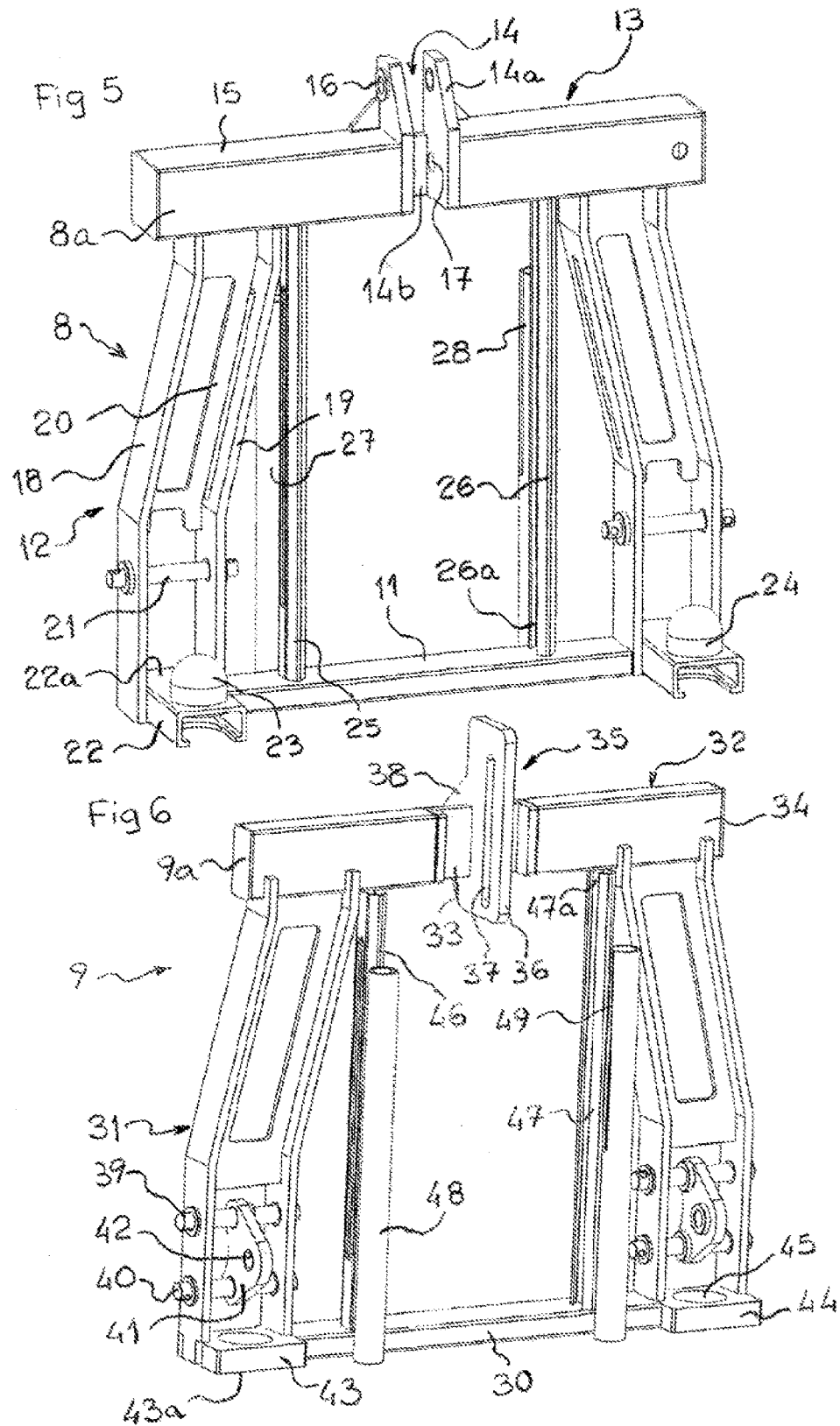

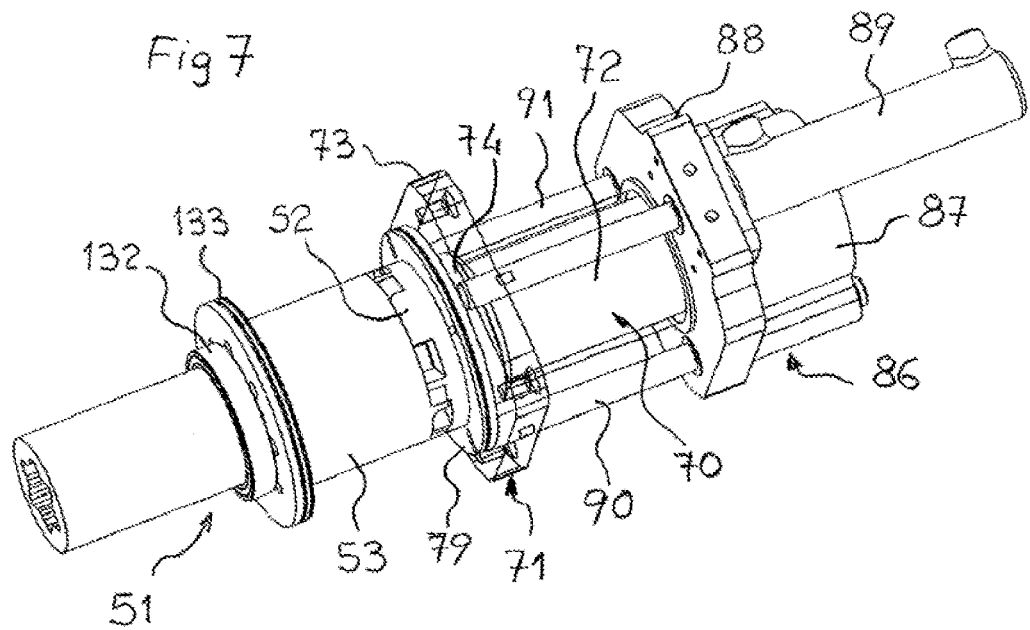
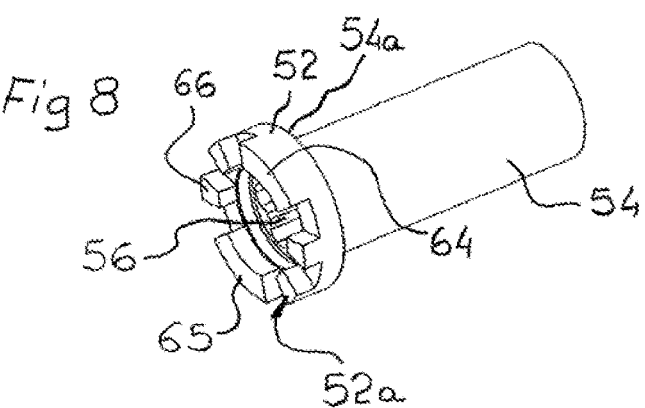
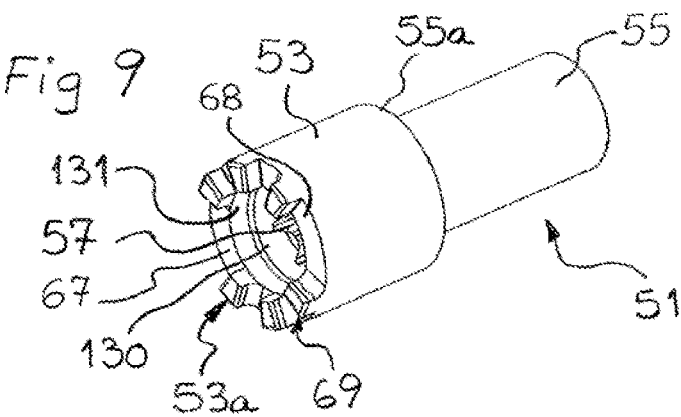

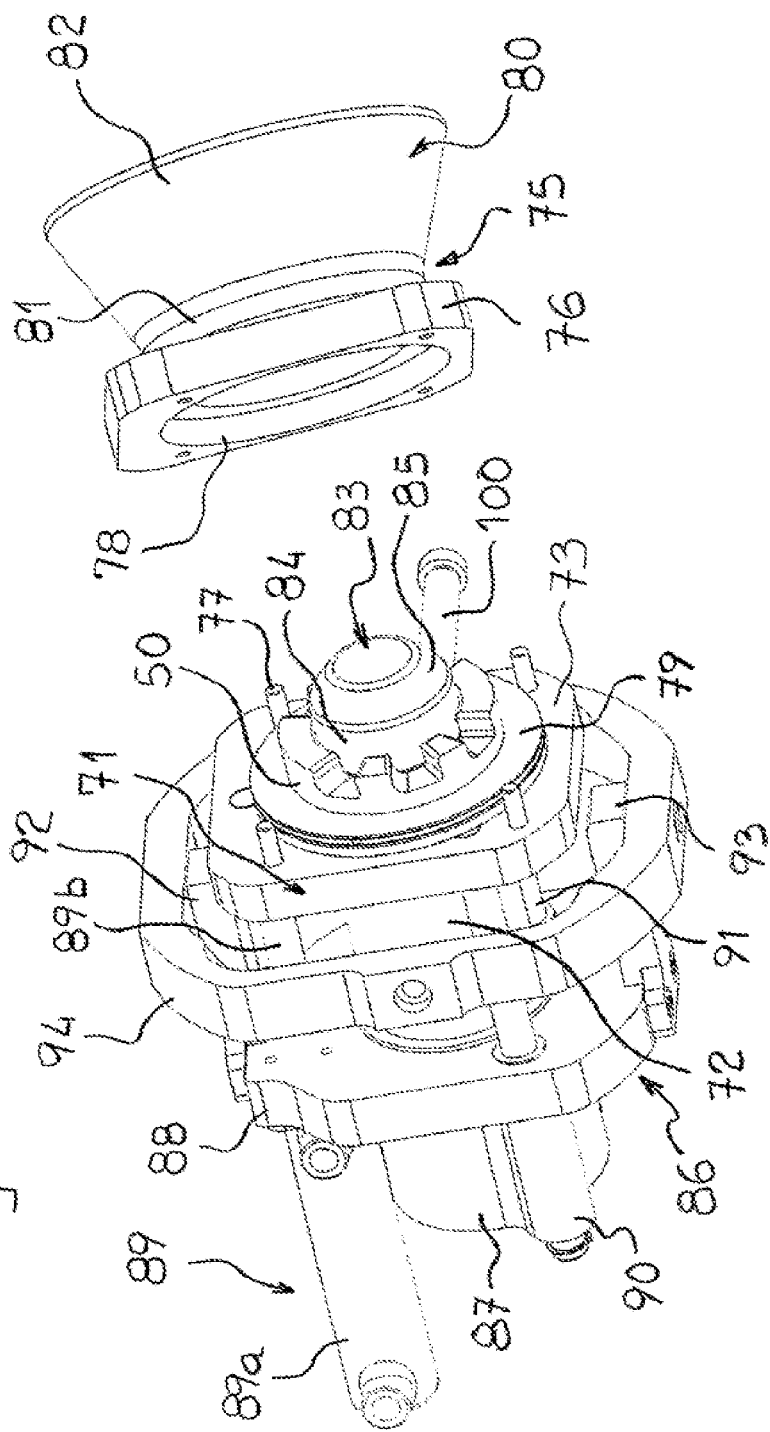

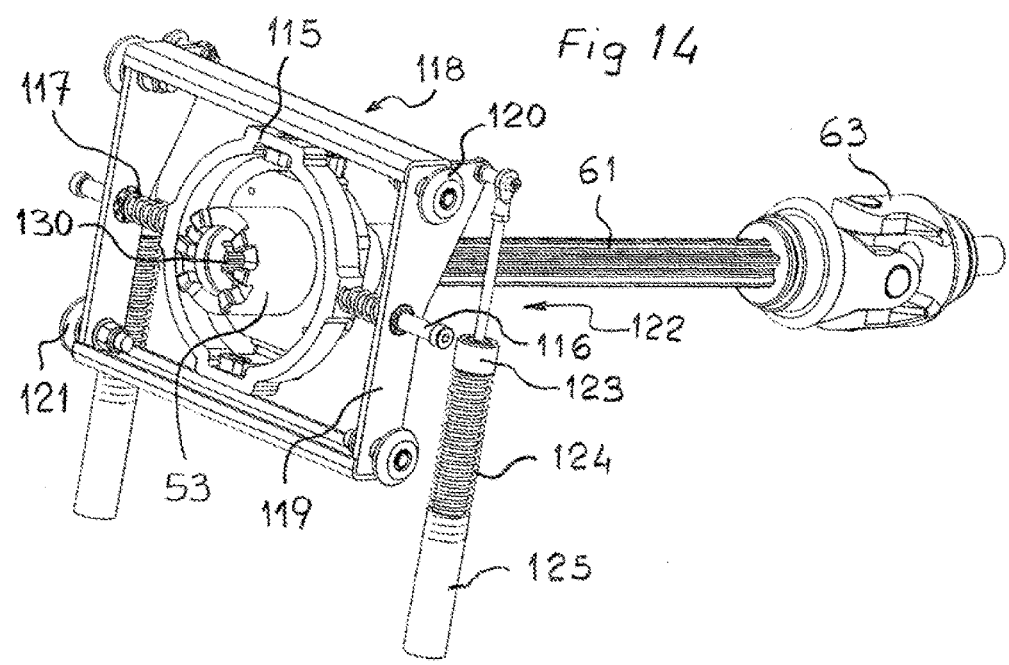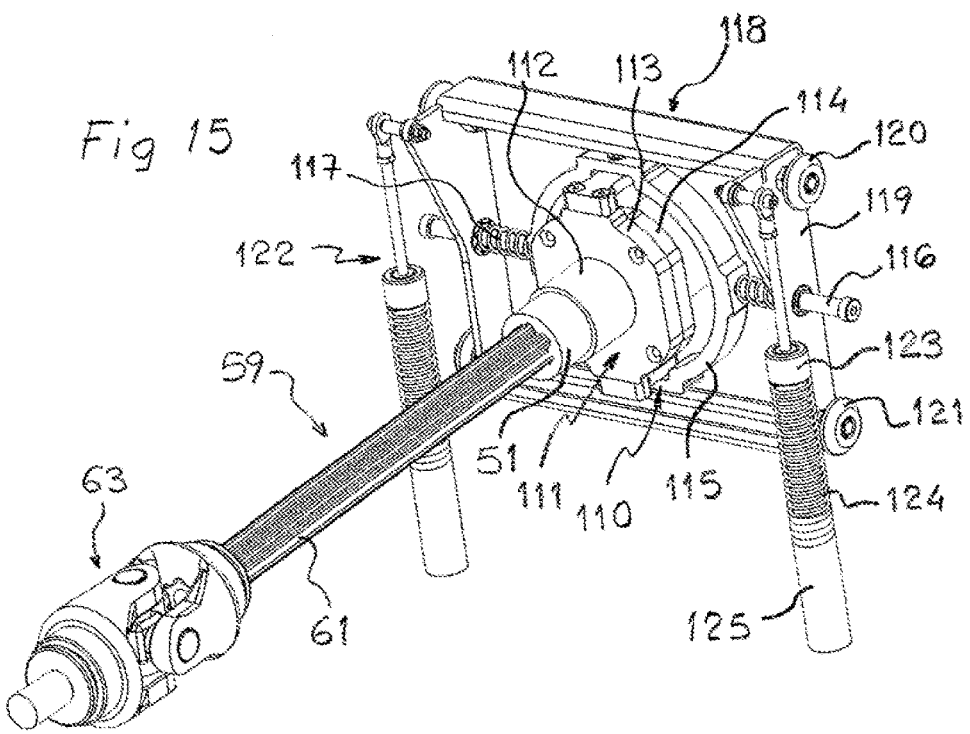

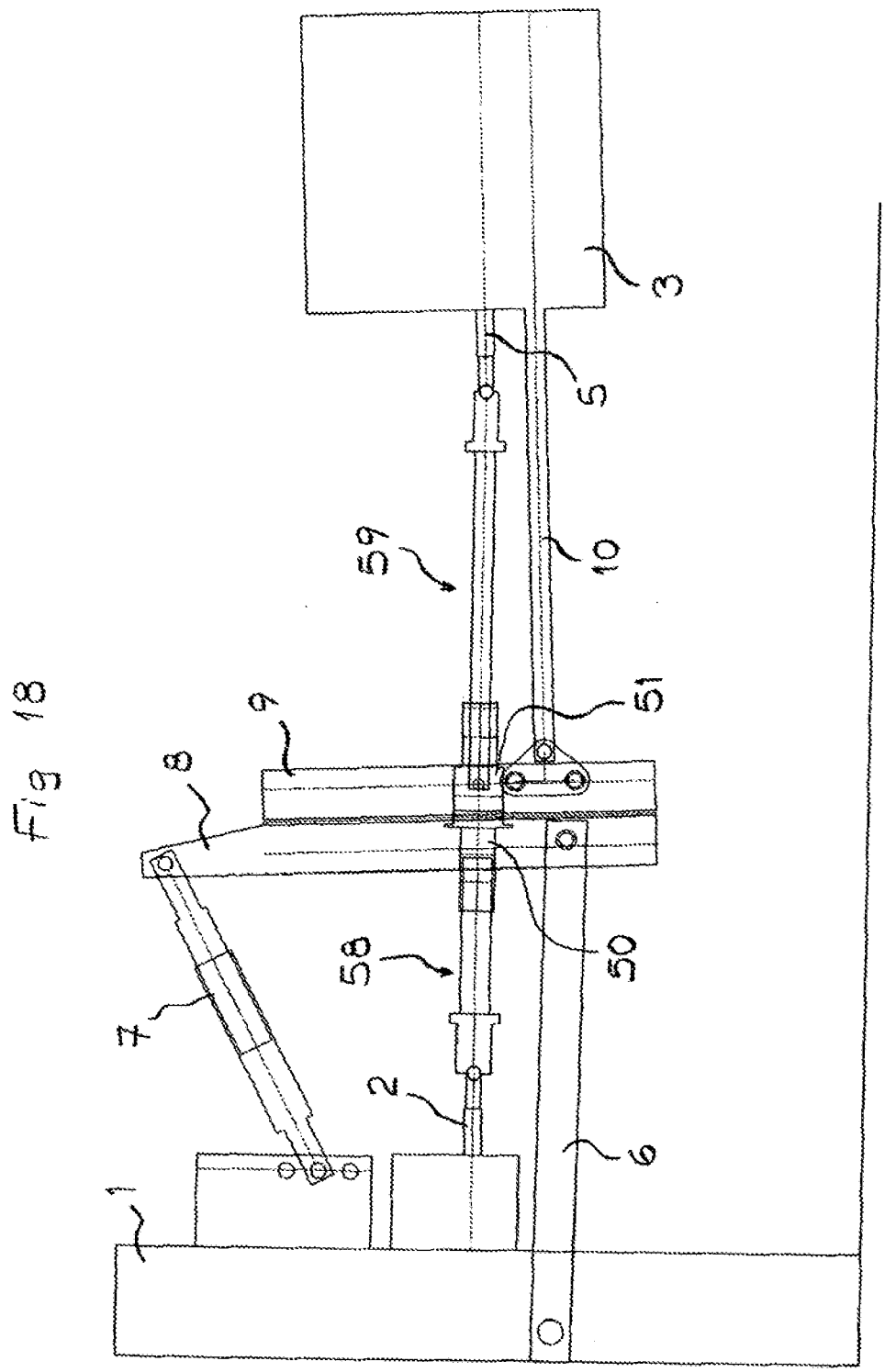

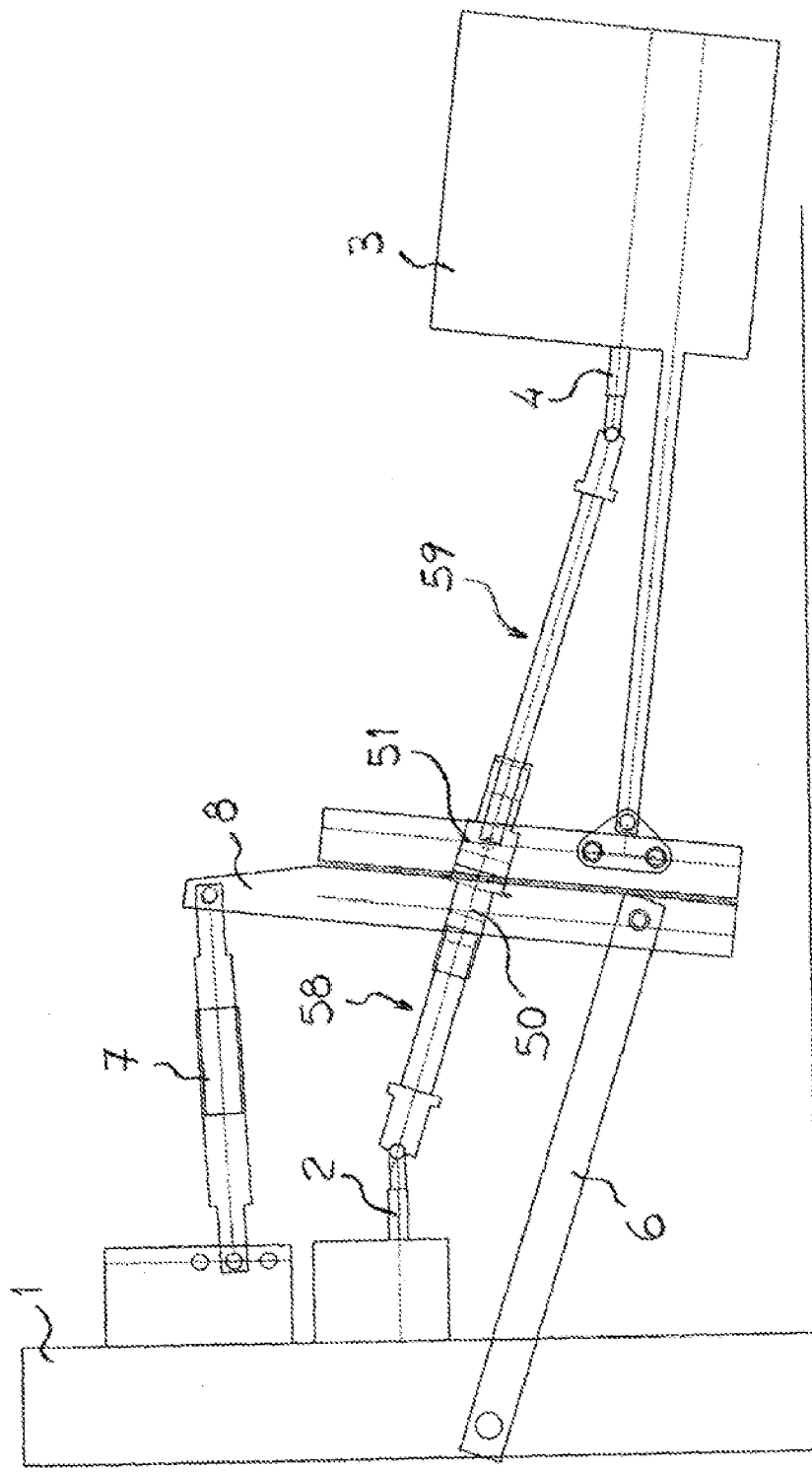

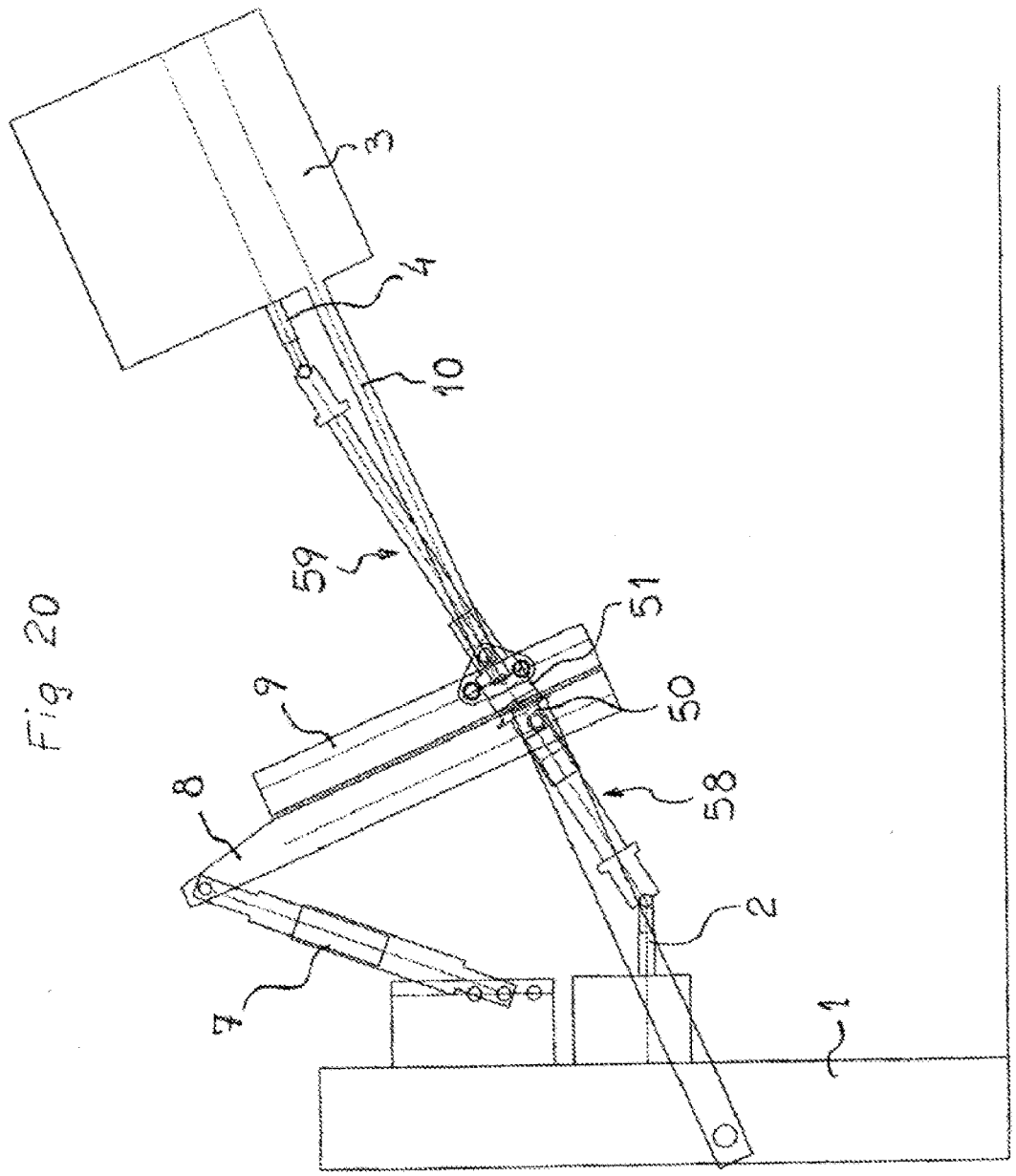

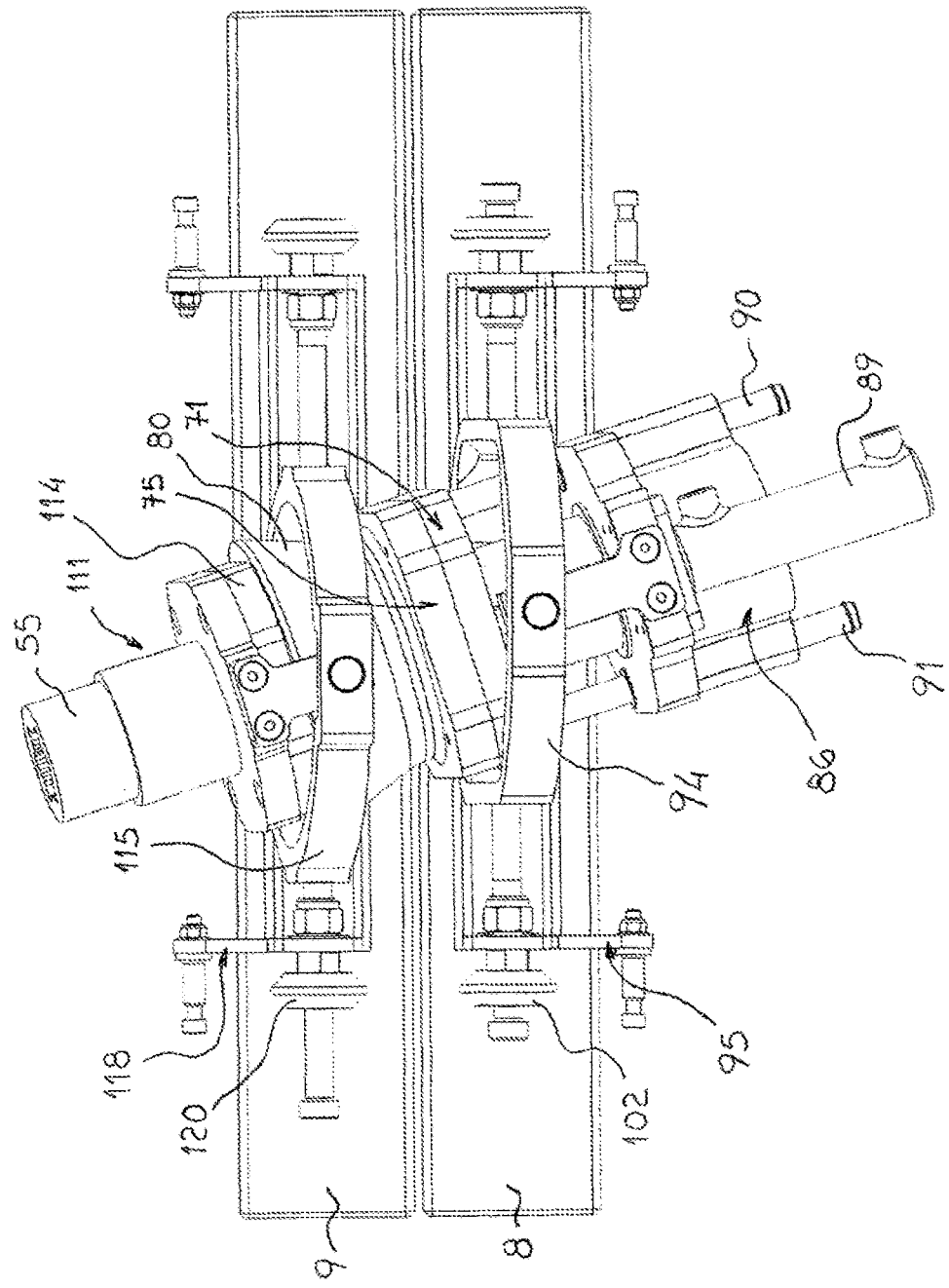

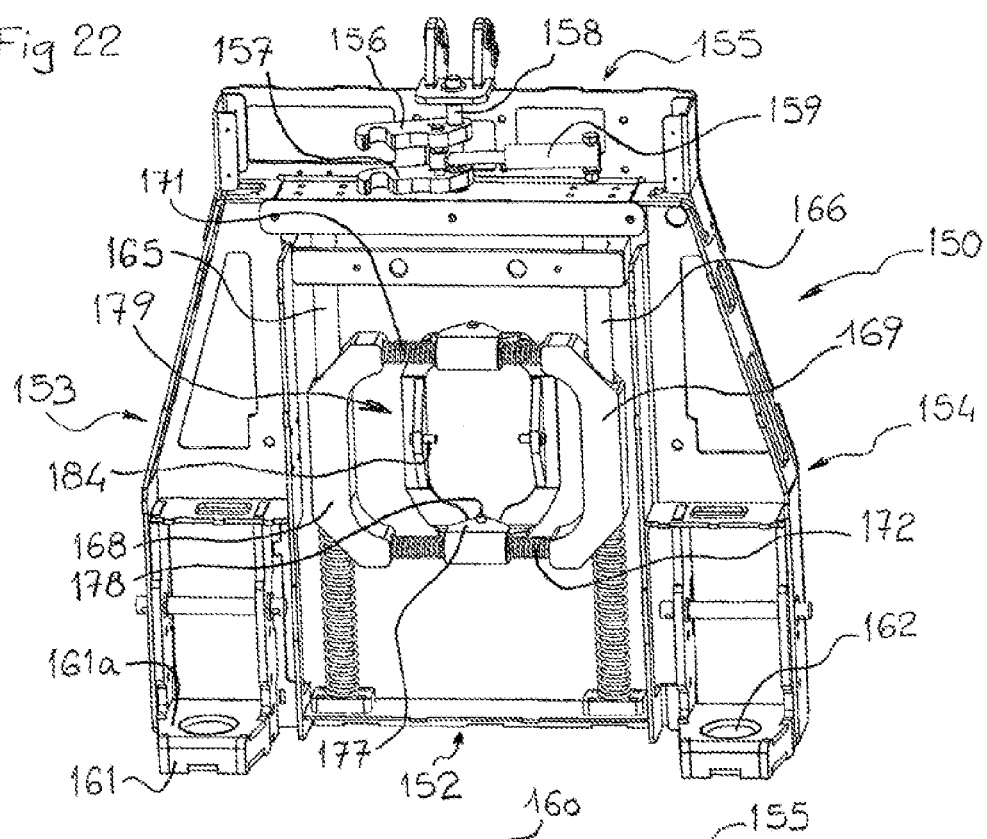
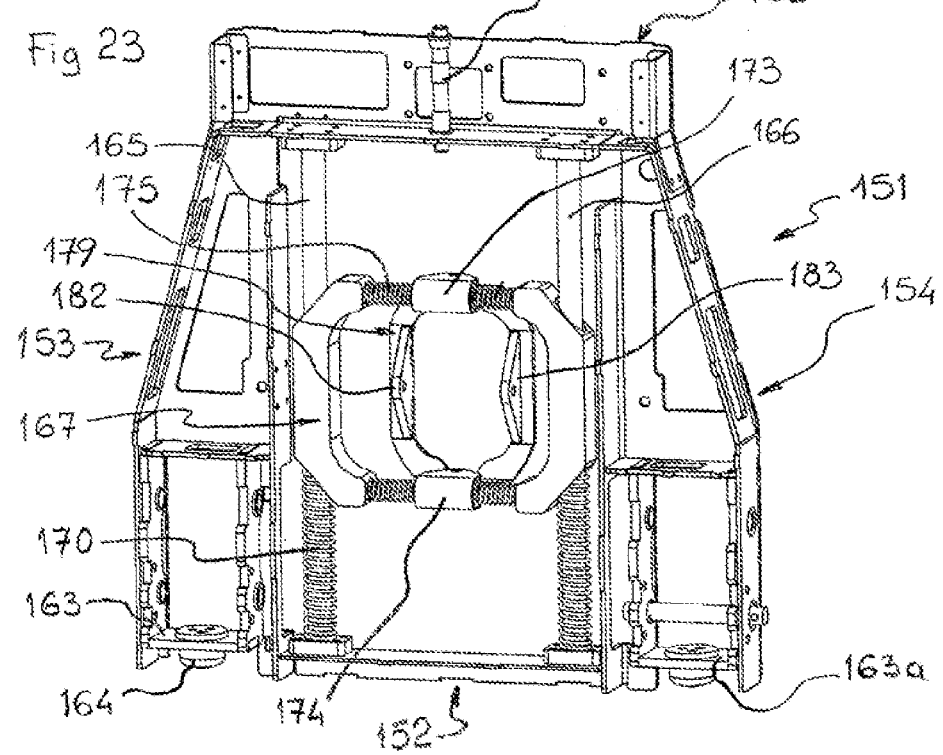

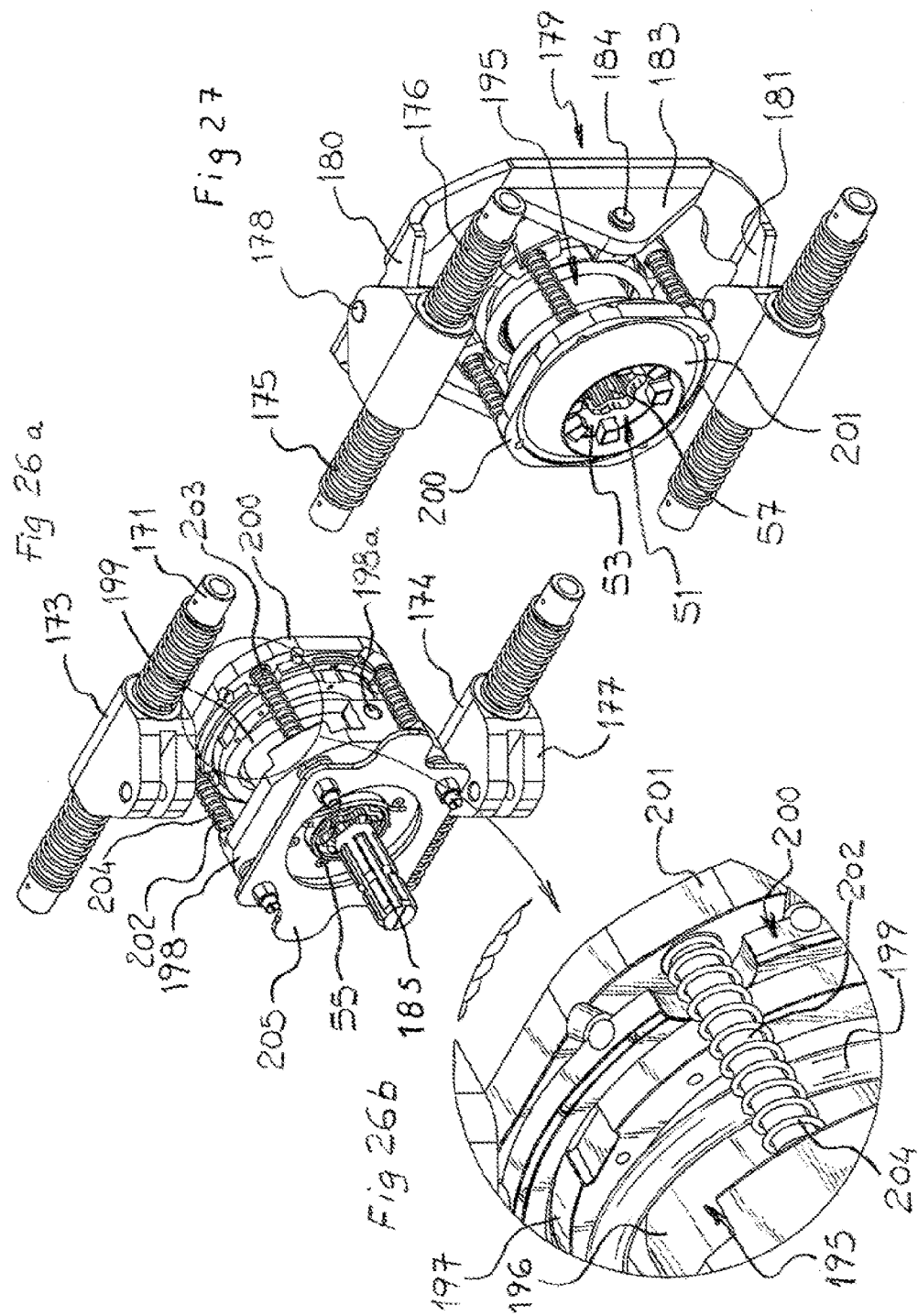

DEVICE FOR HITCHING A TOOL, SUCH AS AN AGRICULTURAL TOOL, ONTO A HAULING SYSTEM OF A VEHICLE SUCH AS AN AGRICULTURAL TRACTOR

The invention relates to a device for hitching a tool provided with a driven shaft, such as an agricultural tool, onto a hauling system of a vehicle, such as an agricultural tractor, provided with a power take-off.

More specifically, the invention relates in particular to a device for hitching a tool such as an agricultural tool provided with a driven shaft, onto a hauling system of a vehicle such as an agricultural tractor provided with a power take-off, comprising:

two frames, consisting of a so-called "hitching" frame provided with means of attachment to the hauling system of the vehicle, and a so-called "hitched" frame provided with means of attachment to the tool, these frames being respectively adapted to extend transversely relative to the vehicle and to the tool, said hitching frame and hitched frame defining joining faces adapted to enable their pairing and comprising relative locking means for securing them in said paired position, transmission means comprising:

complementary coupling members respectively mounted on the hitching frame and on the hitched frame by means of means for the relative displacement of said coupling members along a so-called "longitudinal" axis (x) perpendicular to the joining faces, adapted for moving them between a disengaged position and an engaged position, in the paired position of the two frames, transmission members for respectively connecting the coupling members to the power take-off of the vehicle and to the driven shaft of the tool.

In agriculture, the aim of such hitching devices is to allow automatically hitching an agricultural tool to the three-point hitch system of an agricultural tractor, as well as engaging the power take-off of said agricultural tractor, without the driver of the tractor being required to leave the driver's post.

In order to fulfill this goal, many solutions have been proposed over the last fifty years, in particular by patents DE4132889, U.S. Pat. No. 936,708, FR2340675, DE262162, AT379048, DE3140917, FR2550910, EP0186384, EP0197026, FR2604327, FR2710490, EP1500321, WO2004/077928, GB2408669, which are a mere sample of the filed patents relating to such hitching devices.

However, despite the years that have passed since the first hitching devices of this type were proposed and the supposed benefits of such hitching devices, their use has remained very restricted. This absence of actual use arises primarily from the design of these hitching devices comprising a hitching frame and a hitched frame which each have an integral fixed support for mounting and positioning the coupling member associated with said frame. Due to this design, in fact, there is a resulting:

absence of "universality" resulting primarily from the size of the transmission members connecting the coupling member mounted on the fixed support of the hitched frame and the driven shaft of the agricultural tool, which, when the agricultural tool is short in length between said hitched frame and said driven shaft, requires creating a hitched frame and connecting members specific to each model of agricultural tool power transmission problems resulting primarily from the nature of the connecting members, which for each frame consist of a shaft with universal joints between the frame and the power take-off of the agricultural tractor and the driven shaft of the agricultural tool respectively, forming a transmission link that is unsuitable for the proper transmission of power in the various relative positions of the agricultural tool relative to the agricultural tractor.

The present invention also relates to a hitching device allowing automatic hitching as well as the engagement of the power take-off without the driver of a vehicle being forced to leave the driver's post, and its primary aim is to provide such a hitching device designed so that each assembly of hitching frame/hitched frame is adaptable to any paired vehicle/tool, particularly any paired agricultural tractor/agricultural tool, and ensures proper transmission of power for all relative positions of the tool with respect to the vehicle.

To this end, the invention relates to a hitching device of the type described in the preamble above, comprising:

two frames consisting of a hitching frame provided with means of attachment to the vehicle hauling system, and a hitched frame provided with means of attachment to the tool, transmission means comprising complementary coupling members associated with means for relative displacement along a longitudinal axis (x), and transmission members for linking the coupling members to the power take-off of the vehicle and to the driven shaft of the tool, and, according to the invention, this hitching device is characterized in that:

the two coupling members are respectively mounted on the hitching frame and on the hitched frame so as to be:

movable in translation along a so-called "vertical" axis (z) extending in an at least substantially vertical direction in a position of the frame where the joining face of said frame lies in a plane that is at least substantially vertical, freely rotatable about a so-called "transverse" axis (y) forming an orthogonal coordinate system with the longitudinal axis (x) and the vertical axis (z), prepositioning means for positioning each coupling member along a vertical axis (z), are adapted for:

maintaining, when the two coupling members are in the disengaged position, each of said coupling members in a predetermined position along the vertical axis (z) that is adapted to permit their engagement in the paired position of the two frames, allowing, when the coupling members are in the engaged position, displacements of said coupled coupling members along the vertical axis (z), and tilting of said members about the transverse axis (y), the transmission members comprise, associated with each coupling member, a transmission shaft of freely variable length, provided with a hinge member for its respective connection to the power take-off of the vehicle and to the driven shaft of the tool, and integral to the associated coupling member.

The hitching device according to the invention is therefore designed so that the coupling members:

are initially prepositioned so as to enable their coupling into the paired position of the two frames, form a single joined part after coupling, hinged on the power take-off of the vehicle and on the driven shaft of the tool, and adapted to move along a vertical axis (z)

and to tilt about a transverse axis (y) with respect to the paired frames, thereby imparting to the assembly of coupling members/transmission shafts the same kinematic motion as a hitching device designed for directly hitching a tool to the hitching system of a vehicle, specifically an agricultural tool to the three-point hitch system of an agricultural tractor.

The coupling device of the invention therefore firstly consists of a "universal" hitching device adaptable to any paired machine/tool and in particular to any paired agricultural tractor/agricultural tool, by a simple adjustment of the initial position of each of the coupling members along the vertical axis (z).

Secondly, in addition the transmission of power is optimal regardless of the relative position and in particular the angle of tilt of the tool relative to the vehicle.

According to an advantageous embodiment of the invention, the prepositioning means comprise elastic means mounted on each frame and arranged to maintain each coupling member in a predetermined position along the vertical axis (z), prepositioning said coupling member, and to deform elastically in order to permit movement of the coupling members along the vertical axis (z) when they are in their engaged position.

According to this principle, the initial position of each coupling member can be adjusted by modifying the spring rate of the elastic means. However, advantageously according to the invention, the hitching device comprises interchangeable spacing means adapted to be interposed, along the vertical axis (z), between each frame and the elastic means for prepositioning each coupling member, in order to adjust the prepositioning height of said coupling member.

According to an advantageous embodiment of the invention, each coupling member is mounted so as to rotate freely about a vertical axis (z) relative to the corresponding frame.

Furthermore, according to another advantageous embodiment of the invention, each coupling member is mounted so as to move freely in translation along a transverse axis (y) relative to the corresponding frame, said frame comprising elastic means arranged on each side of said coupling member along the transverse axis (y), so as to maintain it in a substantially centered position relative to the frame in the absence of transverse stress.

These two degrees of freedom prevent the transmission means from being subjected to stresses resulting from the usual lateral movements and oscillations to which hitching systems such as the three-point hitch system of agricultural tractors are exposed.

In addition, these degrees of freedom allow the hitching of tools, to a vehicle, that have off-board transmission.

Furthermore, according to another advantageous embodiment of the invention, each coupling member is mounted so as to rotate within a supporting block, at least one of said supporting blocks being divided into a support that is fixed in translation along the longitudinal axis (x) and a support that is movable in translation along the longitudinal axis (x), within which the associated coupling member is rotatably mounted, the means for relative displacement of the coupling members consisting of means for translational movement of each of said movable supports.

Furthermore, according to a first advantageous variant embodiment, both supporting blocks are divided into a support that is fixed in translation along the longitudinal axis (x) and a support that is movable in translation along the longitudinal axis (x). In this case, the means for relative displacement of the coupling members further comprise:

a fluid actuator for moving the movable support of the supporting block of the coupling member mounted on the hitching frame, elastic means positioned between the fixed support and the movable support of the supporting block of the coupling member mounted on the hitched frame.

Such a design, which combines a fluid actuator for moving one of the coupling members and elastic means for biasing the other coupling member toward its engaged position, allows accommodating possible variations in length of the transmission shafts.

According to a second advantageous embodiment which allows accommodating variations in length of the transmission shafts, only the supporting block of the coupling member mounted on the hitching frame is divided into a support that is fixed in translation along the longitudinal axis (x) and a support that is movable in translation along the longitudinal axis (x), and the means for relative displacement of the coupling members then comprise a fluid actuator associated with a fluid accumulator.

Moreover, advantageously according to the invention, each supporting block is mounted so as to rotate freely about one of following two axes, vertical axis (z) or transverse axis (y), within an annular housing that is movable in translation along a vertical axis (z) and that is freely rotatable about the second of the two axes, transverse axis (y) or vertical axis (z), relative to the corresponding frame.

According to this principle, and according to a first advantageous variant embodiment, each supporting block is mounted so as to rotate freely about a transverse axis (y) inside of the annular housing, and each annular housing is mounted so as to rotate freely about a vertical axis (z) relative to two pivot pins that are:

each free to move in translation along a crosspiece of a framework provided with uprights slidably mounted on columns extending along vertical axes (z), which are integral with the corresponding frame, maintained in a centered position between the two uprights by means of springs arranged around crosspieces on either side of said pivot pins.

In this first variation, the coupling device according to the invention advantageously further comprises means for maintaining the supporting block of the coupling member mounted on the hitched frame in a stable position at least substantially centered with respect to the longitudinal axis (x), in the disengaged position of said coupling member, said maintaining means comprising:

an assembly that is movable along the longitudinal axis (x) relative to the supporting block, rotatably connected to said supporting block, and comprising, arranged on either side of the annular housing and connected by longitudinal connecting members:

a retractable front piece arranged so that it is pushed by the coupling member mounted on the hitching frame upon movement when the latter is moved toward the engaged position of the coupling members, a stop plate arranged so that it adjoins and abuts against the annular housing and prevents the movable assembly and the supporting block from pivoting relative to said annular housing, when the coupling members are in the disengaged position, and to be spaced apart from the annular housing by a distance allowing the supporting block to pivot, when said coupling members are in the engaged position, elastic means arranged so as to bias the movable assembly toward its position of rotational stabilization of the supporting block relative to the annular housing, and to allow the movement of said movable assembly upon movement of the coupling member mounted on the hitching frame toward the engaged position of the coupling members.

Such maintaining means allow, in the unhitched position of the tool, keeping the coupling member mounted on the hitched frame in a stable position at least substantially centered with respect to the longitudinal axis (x), which ensures the alignment and coupling of this member with the coupling member mounted on the hitching frame, during the hitching process.

Furthermore, according to an advantageous embodiment concerning these maintaining means, the retractable front piece is arranged to be maintained, by the elastic means of the movable assembly, in a position away from the movable support of the supporting block of the coupling member mounted on the hitched frame, and to be pushed into a stop position against said movable support.

Thus, deployment of the fluid actuator which causes the coupling member mounted on the hitching frame to move, results:

in a first step, in a retraction of the retractable front piece which causes the stop plate to detach from the annular housing and eliminates the stopping action of this stop plate, in a second step, in a compression of the elastic means providing a damping function for the movable support of the supporting block of the coupling member mounted on the hitched frame.

In a second advantageous variant embodiment relating to the principle of mounting supporting blocks in annular housings, each supporting block is mounted so as to rotate freely about a vertical axis (z) inside of an annular housing, and each annular housing comprises two coaxial support shafts mounted so as to rotate freely about a transverse axis (y) relative to the corresponding frame, extending laterally along the same transverse axis (y) on either side of said annular housing, and around each of which is arranged a spring for biasing the annular housing toward its substantially centered position relative to the frame.

Furthermore, according to the invention, each annular housing is then advantageously arranged in a framework provided with uprights each having a rotatably mounted support shaft for said annular housing, said uprights being mounted so as to slide along rails extending along vertical axes (z), that are integral with the corresponding frame.

Moreover, the coupling members advantageously consist, according to the invention, of coupling members which engage by dog clutching, provided with fool-proofing to ensure angular coincidence between said coupling members, such as conventional universal joints, for connection to the power take-off of the vehicle and to the driven shaft of the tool.

Advantageously, according to the invention, in addition these coupling members are in the form of coupling rings having a front face in which coupling teeth are provided.

Furthermore, when the coupling device comprises means for maintaining the supporting block of the coupling member mounted on the hitched frame, in order to finalize the alignment of the coupling members during a hitching procedure, and advantageously according to the invention:

the retractable front piece of said maintaining means consists of a male or female centering cone having a base adapted to surround the coupling ring of the coupling member mounted on the hitched frame, the coupling member mounted on the hitching frame comprises a complementary centering cone, female or male, having a base surrounding the coupling ring of said coupling member, adapted to engage with and push against the centering cone of the hitched frame.

A variant embodiment intended to ensure the alignment of the coupling members during their relative displacement consists, advantageously according to the invention, of equipping one of the coupling members with a so-called "external" centering cone having a base surrounding the constituent coupling ring of said coupling member, adapted to externally guide and center the other coupling member during engagement of said coupling members.

For the same purpose, one of the constituent coupling rings of a coupling member advantageously has, according to the invention, a central region into the axial extension of which extends a so-called "internal" centering cone, and the second coupling ring advantageously has a central hollow area defining a central longitudinal bore of a conical shape that will mate with the internal centering cone, adapted for guiding and centering said internal centering cone.

The internal centering cone preferably further comprises a cylindrical base which extends the associated coupling ring, adapted to form a cylindrical bearing surface for a cylindrical end portion of the bore defined by the other coupling ring.

Such a cylindrical bearing surface is intended to prevent the coupling members from moving away from one another by the pivoting of their joining faces about a transverse axis, when it is necessary to raise the hauling system of the vehicle for coupling purposes (in particular for a tool whose elements driven by the transmission shaft are resting on the ground and must be raised from the ground in order to couple the two coupling members).

According to another advantageous embodiment of the invention, each transmission shaft is a telescopic shaft composed of two telescopic elements comprising:

a so called "male" element, equipped with a hinge member for the respective connection to the power take-off of the vehicle and to the driven shaft of the tool, a so-called "female" element, in addition forming the coupling member.

In addition, each telescopic male element advantageously consists of a splined shaft, and each telescopic female element advantageously consists of a fluted sleeve integral with the coupling ring forming the associated coupling member.

Figure 11:
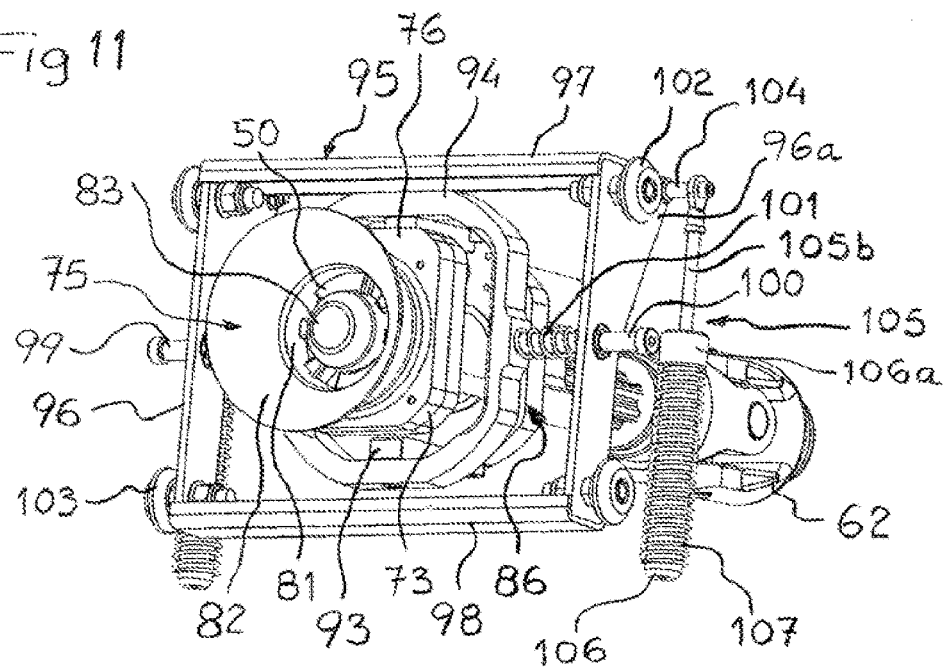
Figure 17:
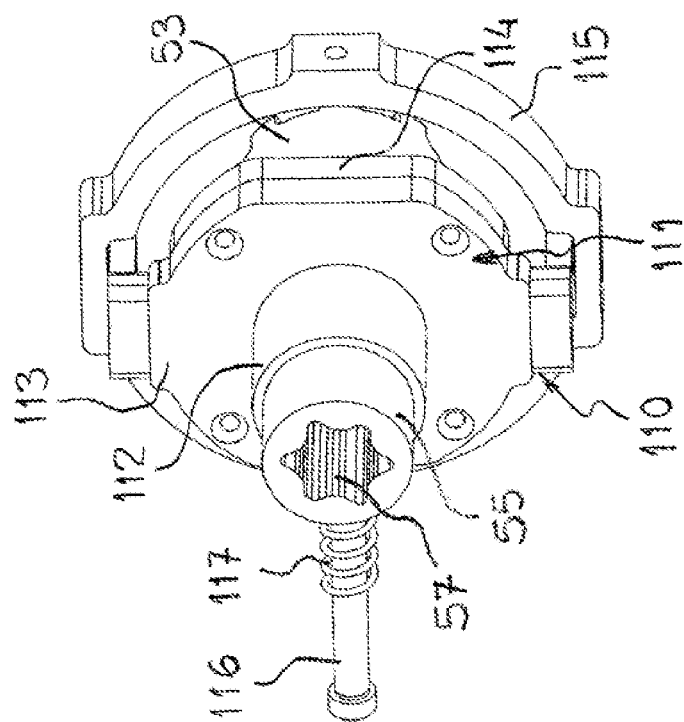
Figure 16:
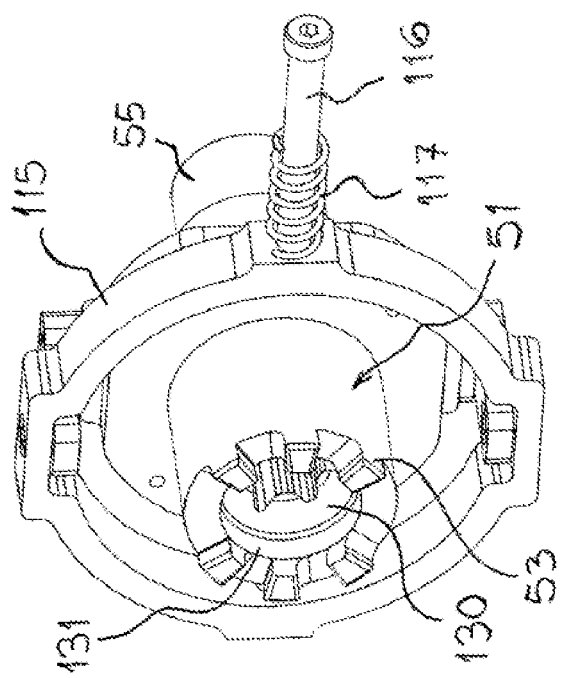
Figure 24:
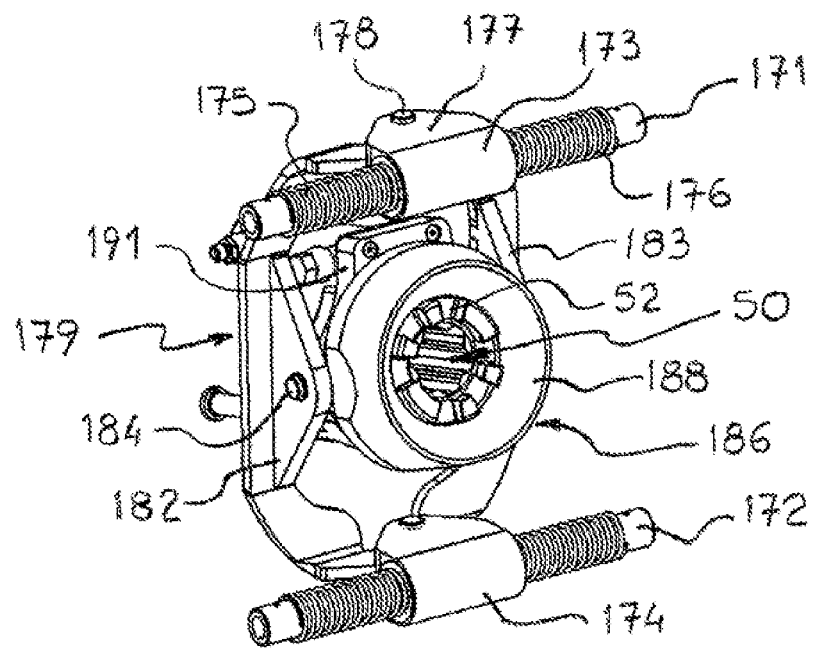
Figure 25:
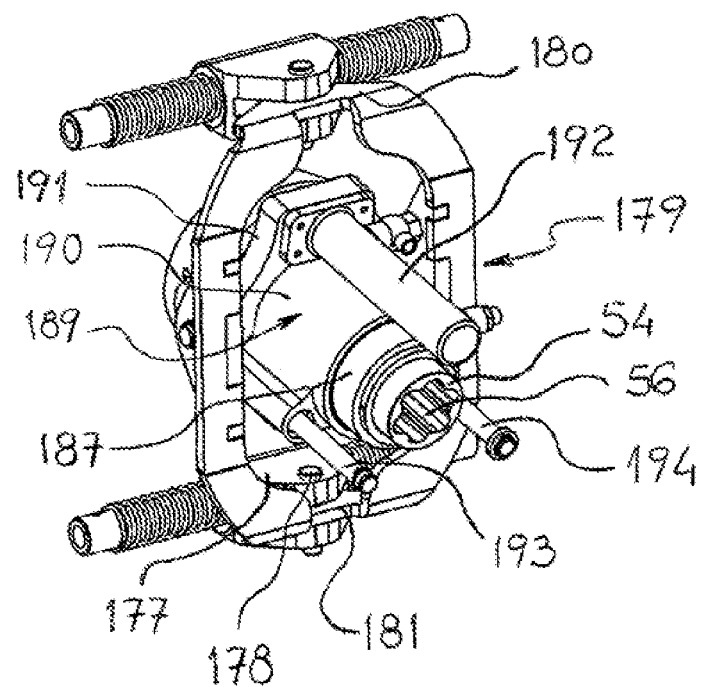

Other objects, features, and advantages of the invention will be apparent from the following detailed description with reference to the accompanying drawings which represent two preferred embodiments provided as non-limiting examples. In these drawings:

FIG. 1 is a schematic perspective view of an agricultural tractor and an agricultural tool represented highly schematically, provided with a first embodiment of a coupling device according to the invention, FIG. 2 is a second perspective view of this first embodiment of the coupling device, where the agricultural tractor is not represented, FIG. 3 is a perspective view of the hitching frame of this first embodiment, provided with its transmission means and mounted on the hauling system of a tractor represented highly schematically, FIG. 4 is a perspective view of the hitched frame of this first embodiment, provided with its transmission means and mounted on an agricultural tool represented highly schematically, FIG. 5 is a perspective view of the hitching frame of this first embodiment, FIG. 6 is a perspective view of the hitched frame of the first embodiment, FIG. 7 is a perspective view, with certain elements hidden or represented as phantom elements, of the coupling members of this first embodiment of the hitching device, their supporting blocks, and their means of relative translational movement, in the engaged position of said coupling members, FIGS. 8 and 9 are perspective views, respectively of the coupling member of the hitching frame (8) and the coupling member of the hitched frame (FIG. 9) of this first embodiment, FIGS. 10 and 11 are two perspective views of the transmission means of a hitching frame according to this first embodiment, FIGS. 12 and 13 are two perspective views which represent the supporting block of the coupling member of the transmission means of the hitching frame of this first embodiment (FIG. 12), and the external centering cone of said transmission means (FIG. 13), shown separated, FIGS. 14 and 15 are two perspective views of the transmission means of the hitched frame of this first embodiment, FIGS. 16 and 17 are two perspective views representing the supporting block of the coupling member of the transmission means of the hitched frame of this first embodiment, FIGS. 18 to 20 are longitudinal views for three different positions of the three-point hitch system of an agricultural tractor and of an agricultural tool, represented highly schematically, equipped with this first embodiment of the hitching device, FIG. 21 is a partial top view of the hitching frame and hitched frame of this first embodiment when in their paired position, representing the coupled transmission means during a swinging movement of the three-point hitch system, FIG. 22 is a perspective view of the hitching frame of a second embodiment of a hitching device according to the invention, FIG. 23 is a perspective view of the hitched frame of this second embodiment of the hitching device according to the invention, FIGS. 24 and 25 are two perspective views of the transmission means of the hitching frame according to this second embodiment, FIGS. 26a and 27 figures are two perspective views of the transmission means of the hitched frame according to this second embodiment, with certain elements hidden, and FIG. 26b is an enlarged detail view of FIG. 26a.

(In the following description, the orthogonal coordinate system (x, y, z) corresponds to the coordinate system as defined in the claims and in the preamble of the present patent application, meaning a coordinate system defined with reference to a position in which the joining face of the frames lies in a vertical plane. In particular, the terms vertical, horizontal, and transverse are therefore used with this orthogonal coordinate system as reference.

In addition, for reasons of simplicity and clarity in the description, the hitching devices of the invention are described below as secured to an agricultural tractor and an agricultural tool resting on the ground, the terms lower, upper, etc. being used with reference to such positioning. In addition, the terms front and rear are used in reference to the forward direction of travel of the tractor.)

The hitching devices represented as examples in the figures consist of devices for hitching an agricultural tool 3 provided with a driven shaft 4, to the three-point hitch system 5 of an agricultural tractor 1 provided with a power take-off 2, said agricultural tractor, agricultural tool, and hauling system being represented highly schematically in FIGS. 1 to 4 and 18 to 20. Thus, in particular with respect to the hauling system, only the elements for joining said system to the hitching device according to the invention are represented, namely two lateral lower arms such as 6 and a central upper arm consisting in the example of a hydraulic cylinder 7.

Firstly, the hitching device represented in FIGS. 1 to 21 comprises a hitching frame 8 adapted to be mounted on the hauling system 2 of the agricultural tractor 1, and a hitched frame 9 adapted to be mounted on the agricultural tool 3 by means of two lateral lower arms such as 10 and a central upper arm (not shown in the figures), said frames being provided with:

locking means adapted to keep them locked in a hitching position where they are coupled, transmission means for coupling the driven shaft 4 of the agricultural tool 3 to the power take-off 2 of the agricultural tractor 1.

Firstly, as is shown in particular in FIG. 5, the hitching frame 8 of the hitching device has a generally trapezoidal shape with a flat front face 8a for contact with the hitched frame 9 of said hitching device. This hitching frame 8 consists of a mechanically welded structure intended to be covered with front plates (not shown) and composed of a lower crosspiece 11 extending between the lower ends of two uprights such as 12, with an upper crosspiece 13 extending between the upper ends of said uprights.

In addition, the upper crosspiece 13 is divided into three sections consisting of a central clevis 14 formed of two longitudinal flanges 14a joined by a transverse web 14b, an end section 15 formed from a tubular bar extending from each of said flanges.

In addition, the height of the two flanges 14a of the central clevis 14 is greater than the height of the tubular bars 15, and thus have surface portions extending the upper face of said bars, each being pierced by facing holes 16 to accommodate a transverse shaft constituting the catching member for the central arm 7 of the hauling system 5.

In addition, one of the tubular bars 15 of this upper crosspiece 13 houses a hydraulic cylinder (not shown) arranged so that its rod can be deployed in the clevis 14 through a hole 17 provided in the flange 14a obstructing the central end face of said tubular bar.

As for the two uprights 12, they consist of two flat parallel bars 18, 19, bent so as to present an angle in the longitudinal profile to give the hitching frame 8 its trapezoidal shape, said flat bars being connected, for substantially two-thirds of their upper portion, by a brace 20 which gives them an H-shaped cross-section.

In addition, each of these uprights 12 accommodates, in its lower portion where is there is no brace 20, a shaft 21 extending between the two flat bars 18, 19 to form the hitching frame 8 catching member for each lower arm 6 of the hauling system 5.

This hitching frame 8 further comprises two baseplates such as 22 provided with flat upper contact faces 22a, each housed and secured between the lower ends of the flat bars 18, 19 of an upright 12, so as to form an extension of the lower crosspiece 11.

The hitching frame 8 also comprises two locator pins 23, 24, each projecting from the flat contact face 22a of a baseplate 22, and each comprising a cylindrical base extended by a hemispherical portion.

The hitching frame 8 further comprises two parallel vertical rails 25, 26 extending between the lower crosspiece 11 and the upper crosspiece 13, said rails being provided with facing guide channels such as 26a for roller wheels which will be described in detail further below.

This hitching frame 8 lastly comprises, each joined to a guide rail 25, 26 so as to lie parallel to said guide rail, at the front of the hitching frame 8, two vertical tubes such as 27 each provided with, along substantially half its length, a facing longitudinal slot such as 28 extending from the upper end thereof.

As is represented in particular in FIG. 6, the hitched frame 9 of the hauling device also has a generally trapezoidal shape provided with a flat front face 9a for contact with the hitching frame 8 of said hitching device. This hitched frame 9 consists of a mechanically welded structure composed of a lower crosspiece 30 extending between the lower ends of two uprights such as 31, with an upper crosspiece 32 extending between the upper ends of said uprights.

This upper crosspiece 32 is divided into three sections consisting of a central transverse plate 33 and a tubular bar 34 extending to each side thereof.

The central plate 33 further serves as a mounting bracket for a mounting plate 35 for attaching the hitched frame 9 to the end of the central upper arm for connecting to the agricultural tool 3, comprising, for the purposes of this attachment, a vertical slot through which said central plate extends.

For the connection to the agricultural tool 3, this connection plate 35 comprises a rear portion 36 in which is formed a vertical slot 37 for accommodating an attachment shaft provided on the central upper arm.

The connection plate 35 also comprises a front portion 38 adapted to fit into the clevis 14 of the hitching frame 8, pierced with a hole 38a arranged to coincide with hole 17 when the two frames 8, 9 are in the paired position, so as to cause the relative locking of said frames by deployment of the rod of the hydraulic cylinder housed in one of the tubular bars 15 of the upper crosspiece 13 of said hitching frame.

The two uprights 31 of this hitched frame 9 are similar to those of the hitching frame 8 and thus consist of two parallel flat bars bent so as to present an angle in the longitudinal profile to give the hitched frame 9 its trapezoidal shape, said flat bars being connected, for substantially two-thirds of their upper portion, by a brace which gives them an H-shaped cross-section.

In addition, each of these uprights 31 accommodates, in its lower portion where there is no brace, two superimposed shafts 39, 40 extending between the two flat bars, forming the guide rods for a slider 41 arranged to move along said shafts for a travel distance corresponding to the width of said uprights.

Each slider 41 constitutes an attachment part for securing the hitched frame 9 to the end of one of the lower arms 6, and for the purposes of this connection, the slider 41 is pierced with a hole 42 to accommodate an attachment shaft provided by said lower arm.

The hitched frame 9 further comprises two baseplates 43, 44 provided with flat lower contact faces 43a, each housed and secured between the lower ends of the flat bars of an upright 31, so as to extend the lower crosspiece 30.

Each of these baseplates 43, 44 is pierced with a circular hole 45 of a diameter that will mate with the base of the locator pins 23, 24 and having a countersink (not shown) at the contact face 43a.

Similarly to the hitching frame 8, the hitched frame 9 further 3o comprises two parallel vertical rails 46, 47 extending between the lower crosspiece 30 and the upper crosspiece 32, said rails being provided with facing guide channels such as 47a for roller wheels which will be described in detail further below.

This hitched frame 9 also comprises, each joined to a guide rail 46, 47 so as to lie parallel to said guide rail, at the back of the hitched frame 9, two vertical tubes such as 48 each provided with, along substantially half its length, a facing longitudinal slot such as 49 extending from the upper end thereof.

As for the transmission means of this hitching device, they comprise complementary coupling members respectively mounted on the hitching frame 8 and on the hitched frame 9, and transmission elements for connecting said coupling members respectively to the power take-off 2 of the agricultural tractor 1 and to the driven shaft 4 of the agricultural tool 3.

Firstly, the coupling members 50, 51 consist of members which couple by dog clutching.

These coupling members 50, 51 each comprise a coupling ring 52, 53 having a front face 52a, 53a in which are provided, in the usual manner, coupling teeth separated by notches, each of said coupling rings forming a larger diameter end section of a tubular shaft 54, 55, separated from said shaft by a radial shoulder 54a, 55a.

In addition, each of these coupling members 50, 51 is pierced by a fluted bore 56, 57 having, for example, a star-shaped cross-section, and constitutes the female element of a telescopic transmission shaft 58, 59 in which the male element consists of a splined shaft 60, 61 provided with a universal joint 62, 63 for respectively connecting to the power take-off 2 of the agricultural tractor 1 and to the driven shaft 4 of the agricultural tool 3.

In addition, the bore 57 of the coupling member 51 associated with the hitched frame 9 comprises an end portion 131 that is cylindrical in shape where it joins the front face 53a of the coupling ring 53, connected to the fluted portion of said bore by a frustoconical portion 130, said end portions 130, 131 being adapted to accommodate a centering member described further below.

The transmission means thus simply comprise, for each frame 8, 9:
  a splined shaft 60, respectively 61, constituting the telescopic male element of a transmission shaft 58, respectively 59, provided with a universal joint 62, respectively 63,
  a coupling member 50, respectively 51, being a single part consisting of: a tubular shaft 54, respectively 55, forming the female telescopic element of the transmission shaft 58, respectively 59; and a coupling ring 52, respectively 53, forming the dog-clutching coupling members of the transmission means.

The coupling members also have a fool-proofing system adapted to ensure angular coincidence between the universal joints 62, 63. In the example, this fool-proofing system consists:
  for the coupling member 50 of the hitching frame 8, of two diametrically opposite teeth 64, 65 of the same length, a length greater than that of the other teeth such as 66,
  for the coupling member 51 of the hitched frame 9, of two diametrically opposite notches 67, 68 of lengths that will mate with those of the two fool-proofing teeth 64, 65, said lengths being greater than the length of the other notches such as 69.

In addition, the teeth such as 64-66 and the notches such as 67-69 typically have side faces combining tapering and undercuts adapted to oppose the uncoupling of the coupling members 50, 51 during their rotation in their engaged state.

In addition, the teeth such as 64-66 have chamfered radial edges to facilitate the insertion of said teeth into the notches 67-69 of the facing coupling member 50, 51.

These coupling members 50, 51 are mounted on the frames 8, 9:
- so as to be freely rotatable about a longitudinal axis (x) in order to rotate the driven shaft 4 of the agricultural tool 3,
- so as to be movable in translation along the longitudinal axis (x) relative to one another, between a disengaged position and an engaged position,
- and, according to the invention, so as to be movable in translation along a vertical axis (z) and a transverse axis (y), and so as be freely rotatable about a transverse axis (y) and about a vertical axis (z).

For this purpose, the coupling member 50 of the hitching frame 8 is mounted so as to rotate freely about the longitudinal axis (x) inside a so-called "movable" support 70, composed of two integrally secured elements which extend one another:
- a front first element 71 comprising a cylindrical sleeve 72 defining a longitudinal bore adapted to house the tubular shaft 54, extended by a rear endplate 73 in which is formed a counterbore into which the bore of the cylindrical sleeve 72 opens, housing a radial bearing 74,
- a rear second element 75 comprising, as one piece:
  - a front endplate 76 adapted to be integrally secured to the rear endplate 73 by means of screws such as 77, pierced by a circular hole of a diameter greater than that of the coupling ring 52, opening in its front mounting face to a counterbore 78 housing a thrust bearing 79 of the needle bearing type abutting axially against the coupling ring 52, arranged to provide an axial bearing surface against the inner race of the radial bearing 74,
  - an external centering element 80 having a cylindrical annular base 81 surrounding the coupling ring 52 but without contact, extended by a centering cone 82 adapted to externally guide and center the coupling ring 53 of the other coupling member 51 during engagement of said coupling members.

This movable support 70 is also provided with an internal centering cone 83 of a shape that will mate with the end portions 130, 131 of the bore 57 of the coupling member 51. This internal centering cone 83 consists of, as one piece:
- a cylindrical front portion 84 adapted to fit partially within the coupling ring 52 and to lie partially in the rear extension of said coupling ring,
- a rear tapered portion 85 adapted to internally guide and center the coupling ring 53 of the other coupling member 51 during engagement of said coupling members, and to form a cylindrical bearing surface for the cylindrical end portion 131 of the bore 57 of the coupling member 51.

In order to achieve the movements along the longitudinal axis (x) of the coupling member 50 of the hitching frame 8 with respect to the coupling member 51 of the hitched frame 9, the movable support 70 is movable in translation along a longitudinal axis (x) relative to a so-called "fixed" support 86.

This fixed support 86 is composed of, as one piece, a cylindrical sleeve 87 defining a lined longitudinal bore within which the cylindrical sleeve 72 of the front element 71 slides, and a rear endplate 88 pierced with a circular hole which extends the bore of said cylindrical sleeve 87.

The means for displacing the coupling member 50 along the longitudinal axis (x) comprise an actuating cylinder 89 associated with a hydraulic accumulator, its body 89a being mounted on the endplate 88 of the fixed support 86 so as to form a frontward extension of said endplate along a longitudinal axis (x), and its rod 89b being secured to the endplate 73 of the front element 71 of the movable support 70.

These displacement means further comprise two guide rods 90, 91 extending along longitudinal axes (x), connected to the endplate 73 of the front element 71 of the movable support 70, and sliding longitudinally relative to the fixed support 86.

In addition, the cylinder 89 and the two guide rods 90, 91 are arranged so that the axis of said cylinder coincides with the top vertex of an isosceles or equilateral triangle whose base vertices coincide with the respective axes of the two guide rods 90, 91.

In order to impart a degree of freedom in rotation about the vertical axis (z) to the coupling member 50, the endplate 88 of the fixed support 86 is mounted so as to rotate freely about a vertical axis (z) inside of an annular housing 94. For this purpose, two rear longitudinal tabs, upper 92 and lower 93, extending along a longitudinal axis (x), are secured at one of their ends to this fixed endplate 86, and are mounted so as to pivot about a vertical axis (z) relative to the annular housing 94 at their other end.

In addition, in order to impart a degree of freedom in rotation about the transverse axis (y) to the annular housing 94, said housing is mounted so as to pivot within a framework 95 comprising two uprights such as 96, an upper crosspiece 97, and a lower crosspiece 98.

For its pivoting, the annular housing 94 is provided with two external transverse shafts 99, 100 extending coaxially on either side of said annular housing and each rotatably mounted in the facing upright 96 of the framework 95.

In addition, a spring such as 101 is assembled around each shaft 99, 100 so as to extend between the annular housing 94 and the upright 96 of the framework 95, for maintaining said annular housing in a substantially centered position between said uprights 96.

Finally, in order to impart a degree of freedom in translation along a vertical axis (z) to the framework 95, said framework is provided with four roller wheels rotating about transverse axes (y), adapted to move within the guide rails 25, 26: two upper roller wheels such as 102 arranged one on each side of the top rail 97, and two bottom roller wheels such as 103 arranged one on each side of the bottom rail 98.

Lastly, concerning the hitching frame 8, said frame comprises prepositioning means for positioning the framework 95 along the guide rails 25, 26, arranged:
- in the disengaged state of the coupling members 50, 51, so as to maintain the framework 95 in a predefined position corresponding to a predetermined position of the coupling member 51 along the vertical axis (z),
- in the engaged state of the coupling members 50, 51, so as to deform elastically in order to permit movement of said coupling members along the vertical axis (z).

These prepositioning means are integrated into the two vertical tubes 27 and comprise, firstly, a pneumatic cylinder 105 whose rod 105a is coupled to a shaft 104 connecting said rod to a front extension 96a formed at the upper end of the uprights 96 of the framework 95, said shaft extending for this purpose through the vertical slot 28 formed in each tube 27.

These prepositioning means further comprise, housed in each vertical tube 27, a cylindrical casing 106 having an inside diameter adapted to house the body 105b of the cylinder 105, provided with an upper section 106a having an outside diameter greater than its current outside diameter, defining an external radial shoulder.

These prepositioning means also comprise a coil spring 107 arranged around the cylindrical casing 106, and spacers such as 108 of predefined lengths that are suitable for insertion into the cylindrical tube 27 so as to extend between the bottom of the tube 27 and the lower end of the spring 107.

According to this principle, the prepositioning of the framework 95 is therefore determined by the length of the spacers 108.

The means for mounting the coupling member 51 on the hitched frame 9 are similar in principle to those described above, but are simplified due to the absence of movement of the coupling member 51 along a longitudinal axis (x).

Thus, first, the coupling member 51 of the hitched frame 9 is mounted so as to rotate freely about the longitudinal axis (x) within a fixed support 110 composed of two elements integrally secured as an extension of one another:
- a rear first element 111 comprising a cylindrical sleeve 112 defining a longitudinal bore adapted to house the tubular shaft 55, extended by a front endplate 113 in which is formed a counterbore into which the bore of the cylindrical sleeve 112 opens, housing a radial bearing 132,
- a front second element 114 consisting of an endplate adapted to be integrally secured to the front endplate 113, having a counterbore formed in its mounting face to house a thrust bearing 133 of the needle bearing type abutting axially against the coupling ring 53, arranged to provide an axial bearing surface against the inner race of the radial bearing 132.

In order to impart a degree of freedom in rotation about the vertical axis (z) to the coupling member 51, the endplate 113 is mounted so as to rotate freely about a vertical axis (z) inside of an annular housing 115.

In addition, in order to impart a degree of freedom in rotation about the transverse axis (y) to this annular housing 115a, said housing is mounted so as to pivot within a framework 118, and comprises for this purpose two external transverse shafts such as 116 around each of which is arranged a spring 117 extending coaxially to each side of said annular housing, and each shaft rotatably mounted in an upright 119 of the framework 118.

Finally, in order to impart a degree of freedom in translation along a vertical axis (z) to the framework 118, said framework is provided with four roller wheels rotating about transverse axes (y), adapted to move within the guide rails 46, 47: two upper roller wheels such as 120 and two lower roller wheels such as 121.

Lastly, this hitched frame 9 comprises prepositioning means for positioning the framework 118 along the guide rails 46, 47, identical to those equipping the hitching frame 8 and therefore comprising two identical assemblies, each housed in a tube 48, and consisting of:
- an actuating cylinder 122 housed in a cylindrical casing 123 around which is arranged a coil spring 124,
- a set of spacers 125 of different lengths.

The hitching procedure using this hitching device is described below.

Beforehand, after mounting the hitching frame 8 on an agricultural tractor 1 and mounting a hitched frame 9 on one or more agricultural tools, an initial step consists of adjusting, by means of spacers 108, the initial position along a vertical axis (z) of the coupling member 50 mounted on the hitching frame 8, then adjusting, by means of spacers 125, the position along a vertical axis (z) of the coupling member 51 of each hitched frame 9 so that it is coincident with that coupling member 50 when pairing the two frames 8, 9.

Once these initial adjustments have been made, each coupling consists of prepositioning the agricultural tractor 1 and then causing the hitching frame 8 to lift, until partial contact of the respective contact faces 22a, 43a of the baseplates 22 and 43 is obtained, a position where the locator pins 23, 24 are partially engaged in the facing holes 45.

The next step is to deploy the central actuating cylinder 7 of the hauling system 5 which causes the hitching frame 8 to tilt, during which the locator pins 23, 24 act as the pivot pins of said tilt, until the end faces 8a, 9a of the two frames 8, 9 are in contact with one another, a position where the opposing faces 22a, 43a of the faceplates 22 and 43 are also in contact with one another.

Furthermore, in this final paired position of the two frames 8, 9, the front portion 38 of the plate 35, forming a hook, is inserted into the clevis 14, and the actuating cylinder housed in the crosspiece 15 can therefore be activated to ensure the relative locking of said frames.

In addition, once this pairing is achieved, the two coupling members 50, 51 are substantially at the same height because of the initial adjustment of their position along a vertical axis (z).

Their coupling is thus obtained by actuating the cylinder 89, and is facilitated firstly by the two external and internal centering cones 82 and 83, then by the chamfered shape of the radial edges of the teeth 64-66.

Once coupled and hitched, as represented in FIGS. 18 to 20, the degree of freedom in translation along a vertical axis (z) and the degree of freedom in rotation about a transverse axis (y), imparted to the coupling members 50, 51 relative to the paired frames 8, 9, make it possible to keep the transmission shafts 58, 59 coaxial regardless of the angle of tilt of the tool 3 in relation to the tractor 1, and therefore to give the assembly of coupling members 50, 51/transmission shafts 58, 59 the same kinematic motion as that of a hitching device designed for directly hitching an agricultural tool 3 to the three-point hitch system 5 of an agricultural tractor 1.

Thus, in particular, the transmission of power is optimal regardless of the relative position and in particular the angle of tilt of the tool 3 in relation to the tractor 1.

In addition, as shown in particular in FIG. 21, the degree of freedom in translation along a transverse axis (y) and the degree of freedom in rotation about a vertical axis (z) provide freedom of movement of the transmission means relative to the frames 8, 9, which eliminates the exposing of said transmission means to the stresses resulting from the lateral movements and swaying to which the three-point hitch systems of agricultural tractors are usually subjected.

FIGS. 22-27 represent a second variant of the hitching device according to the invention, of which only the elements differing from those of the first embodiment are described in detail below.

As with the previous embodiment, this hitching device comprises a hitching frame 150 adapted to be mounted on the hauling system 5 of an agricultural tractor 1, and a hitched frame 151 adapted to be mounted on an agricultural tool 3.

First, as represented in FIG. 22, the hitching frame 150 and the hitched frame 151 of this hitching device have a general trapezoidal shape similar to that of the two frames 8, 9 described above, and consist of mechanically welded structures composed of a lower crosspiece 152 extending between the lower ends of two uprights 153, 154, with an upper crosspiece 55 extending between the upper ends of said uprights.

The means for locking these two frames 150, 151 consist of:
- for the hitching frame 150, two superposed locking hooks 156, 157 mounted so as to rotate in parallel planes (x, z) about a vertical axis 158 positioned axially in the upper crosspiece 155, their rotation driven by an actuating cylinder 159 housed in said upper crosspiece,
- for the hitched frame 151, a vertical shaft 160 positioned axially in the upper crosspiece 155.

In addition, for pairing the two frames 150, 151, the hitching frame 150 has two baseplates such as 161 provided with flat upper contact faces 161a and each pierced with a circular opening 162, said baseplates each being positioned between the lower ends of one of the uprights 153, 154, so as to form an extension of the lower crosspiece 152.

The hitched frame 151 also comprises two baseplates such as 163 provided with flat lower contact faces 163a, each positioned between the lower ends of one of the uprights 153, 154, so as to form an extension of the lower crosspiece 152.

Each of these baseplates 163 further comprises a locator pin 164 projecting below the flat contact face 163a of said baseplate, and each comprising a cylindrical base of a diameter that will mate with the circular opening 162 formed in the baseplates 161 of the hitching frame 150, extended by a hemispherical portion.

Furthermore, each of the two frames 150, 151 comprises two vertical columns 165, 166 each positioned near an upright 153, 154 and extending between the lower crosspiece 152 and the upper crosspiece 155.

These two frames are each also provided with a framework 167 mounted so as to slide along the two columns 165, 166, in other words so as to be movable along a vertical axis (z), said framework consisting of:
- two uprights 168, 169 each mounted so as to slide along a column 165, 166, and integrating sleeve bearings for this purpose,
- two crosspieces, upper 171 and lower 172, respectively extending between the upper and lower ends of the two uprights 168, 169.

Each of these frameworks 167 further comprises, mounted so as to slide along each crosspiece 171, 172, in other words movable along a transverse axis (y), a sleeve 173, 174 incorporating a sleeve bearing, maintained in the central position of said crosspiece by means of two springs 175, 176 arranged one on each side of said sleeve and extending between the latter and the corresponding upright 168; 169.

In addition, each of the sleeves 173, 174 is laterally extended by a clevis 177 housing a vertical shaft 178.

Each of the frames 150, 151 further comprises prepositioning means for positioning the frameworks 167 along the columns 165, 166.

These prepositioning means comprise coil springs 170 each arranged around one of the columns 165, 166, and spacers (not shown) of predetermined heights, consisting for example of clamps adapted to be positioned around the columns 165, 166, between the lower crosspiece 152 and the lower end of the coil springs 170.

According to this principle, the prepositioning of the frameworks 167 is simply determined by the height of the spacers.

Each of the frames 150, 151 also comprises an annular housing 179 of substantially rectangular shape, from which extend:
- two parallel flanges, upper 180 and lower 181, extending in planes (x, y), each adapted to be housed in the clevis 177 of one the sleeves 173, 174, thereby imparting a degree of freedom in rotation about a vertical axis (z) to the annular housing 179,
- two parallel side flanges 182, 183, extending in planes (x, z), provided with facing pivot pins such as 184 defining an axis of rotation extending along a transverse axis (y).

The coupling members 50, 51 of this hitching device consist of members which couple by dog clutching, identical to those described above, and therefore each comprises a coupling ring 52, 53 having a front face 52a, 53a in which are provided coupling teeth separated by notches, each of said rings forming an end section of larger diameter of a tubular shaft 54 55, separated therefrom by a radial shoulder 54a, 55a.

Each of these coupling members 50, 51 is further pierced by a fluted bore 56, 57 having, for example, a star-shaped cross-section.

It should be noted that, as represented in FIG. 26a, the coupling member 51 mounted on the hitched frame 151 may be provided with an adjustment sleeve 185 for a universal joint of long length, composed of two coaxial splined shaft sections of different diameters, one of them a grooved section adapted to be housed in the fluted bore 57 of the coupling member 51.

As above, these coupling members 50, 51 are mounted on the frames 150, 151 so as to be:
- freely rotatable about a longitudinal axis (x) in order to rotate the driven shaft 4 of the agricultural tool 3,
- movable in translation along the longitudinal axis (x) relative to one another, between a disengaged position and an engaged position,
- movable in translation along a vertical axis (z) and a transverse axis (y),
- and freely rotatable about a transverse axis (y) and about a vertical axis (z).

For this purpose, as represented in FIGS. 24, 25, the coupling member 50 of the hitching frame 150 is, first of all, mounted so as to rotate freely about the longitudinal axis (x) inside of a movable support 186, composed of two integrally secured elements which extend one another:
- a front first element comprising a cylindrical sleeve 187 defining a longitudinal bore adapted to house the tubular shaft 54, extended by an endplate (not seen in the figures),
- a rear second element comprising a female centering cone 188 of which the base surrounds the base of the coupling ring 52.

In order to achieve the movements of said coupling member 50 along the longitudinal axis (x), the movable support 186 is movable in translation along a longitudinal axis (x) relative to a so-called "fixed" support 189 composed of, as one piece:
- a cylindrical sleeve 190 defining a lined longitudinal bore within which the cylindrical sleeve 187 of the movable support 186 slides,
- a rear annular endplate 191 defining a circular hole which extends the bore of the cylindrical sleeve 187.

The means for displacing the coupling member 50 along the longitudinal axis (x) comprise an actuating cylinder 192 whose body is mounted on the annular endplate 191 of the fixed support 189, so as to form a frontward extension of said endplate along a longitudinal axis (x), and whose rod is secured to the endplate of the movable support 186.

These displacement means further comprise two guide rods 193, 194 extending along longitudinal axes (x), connected to the endplate of the movable support 186 and sliding longitudinally relative to the fixed support 189.

Furthermore, as represented in FIGS. 24 and 25, the annular endplate 191 is mounted so as to pivot relative to the annular housing 179 by means of pivot pins 184, such that the coupling member 50 is provided with:

a degree of freedom in rotation about a transverse axis (y),
the degree of freedom in rotation about the vertical axis (z) imparted to the annular housing 179,
and the degrees of freedom in translation along a transverse axis (y) and a vertical axis (z) imparted to the annular housing 179.

As represented in FIGS. 26a, 26b, and 27, the coupling member 51 of the hitching frame 151 is, first of all, also mounted so as to rotate freely about the longitudinal axis (x) inside of a movable support 195 having a cylindrical sleeve 196 defining a longitudinal bore adapted to house the tubular shaft 55, extended by a front endplate 197 for frontal support of the coupling ring 53.

This movable support 195 is also mounted so as to slide within an annular guide piece 198 that is fixed in translation and, furthermore, is laterally pierced with two external diametrically opposite holes 198a for mounting the guide piece 198 in the annular housing 179, and for this purpose adapted to house the pivot pins 184 of said annular housing.

Furthermore, this annular guide piece 198 and the cylindrical sleeve 196 are provided with longitudinal abutment elements, not seen in the figures, determining the maximum position that the front endplate 197 and therefore the coupling ring 53 can be distanced from said guide piece, a position toward which the movable support 195 is biased by means of a spring 199 arranged around the cylindrical sleeve 196, in abutment between said endplate 197 and guide piece 198.

The coupling member 51 thus has a degree of freedom in rotation about a transverse axis (y), and the three degrees of freedom in rotation and in translation imparted to the annular housing 179.

In addition, when coupling the coupling members 50, 51 as obtained by deployment of the actuating cylinder 192 of the hitching frame 150, the spring 199 is compressed and thus acts as a shock absorber, absorbing the fluctuations in the length of the transmission members.

As represented in FIGS. 26a, 26b, and 27, the hitched frame 151 is further provided with means for maintaining the coupling member 51 in a stable position that is at least substantially centered relative to the longitudinal axis (x), when said coupling member is in the disengaged position.

These maintaining means comprise an assembly that is movable along the longitudinal axis (x) relative to the movable support 195 and to the annular guide piece 198, comprising, arranged on each side of the annular housing 179 and connected by longitudinal braces such as 202, 203:

a retractable front piece 200, 201 arranged so that it is pushed by the female centering cone 188 associated with the coupling member 50 of the hitching frame 150, upon deployment of the cylinder 192, a stop plate 205 arranged so that it adjoins and is in abutment against the annular housing 179 and prevents the movable assembly and the movable support 195 from pivoting relative to said annular housing, when the coupling members 50, 51 are in the disengaged position, and to be spaced apart from the annular housing 179 by a distance allowing the pivoting of the movable support 195 when said coupling members are in the engaged position, springs 204 arranged around the braces 202, 203, in abutment between the annular guide piece 198 and the retractable front piece 200, 201, thereby biasing the movable assembly toward its position of stabilizing coupling member 51, and allowing the movement of said movable assembly when the coupling member 50 mounted on the hitching frame 150 is moved to the engaged position of the coupling members 50, 51.

In addition, the retractable front piece consists of a male centering cone 201 to mate with the female centering cone 188, longitudinally adjoining an annular plate 200 adapted to abut against the endplate 197 of the movable support 195 when the coupling members 50, 51 are in the engaged position, so as to cancel out the action of the springs 204 and allow spring 199 to fulfill its role of shock absorber.

Lastly, the retractable part 200, 201 is provided with ball plungers (not seen in the figures), mounted inside the annular plate 200, so as to open radially into the bore of the latter.

Such ball plungers are designed, when in contact with the endplate 197 and before retraction, to briefly oppose the movement of the coupling member 50 for a period of time adapted to guarantee effective socketing of the male centering cone 201 within the female centering cone 188.

The coupling device of the invention is therefore adapted:

to allow an operator of average skill to carry out, without leaving the driver's post, all the operations of hitching an agricultural tool to the hauling system of an agricultural tractor: the actual hitching of the agricultural tool, and the coupling of the transmission shafts, to impart to the transmission means the same kinematic motion as in a hitching device designed for directly hitching an agricultural tool 3 to the three-point hitch system 5 of an agricultural tractor 1, and in particular to ensure optimum transmission of power regardless of the relative position and particularly the angle of tilt of the tool 3 relative to the tractor 1.

The invention claimed is:

1. A hitching device for hitching a tool (3) onto a hauling system (5) of a vehicle (1) provided with a power take-off (2), comprising:

two frames, consisting of a hitching frame (8; 150) provided with means of attachment (16, 21) to the hauling system (5) of the vehicle (1), and a hitched frame (9; 151) provided with means of attachment (36, 37, 41, 42) to the tool (3), said frames being respectively adapted to extend transversely relative to the vehicle (1) and to the tool (3), said hitching frame and hitched frame defining joining faces (8a, 9a) adapted to enable their pairing and comprising relative locking means (14, 38; 156-160) for securing them in said paired position, transmission means comprising:

complementary coupling members (50, 51) respectively mounted on the hitching frame (8; 150) and on the hitched frame (9; 151) by means (89; 192, 199) for relative displacement of said coupling members along a longitudinal axis (x) perpendicular to the joining faces (8a, 9a) adapted for moving said coupling members between a disengaged position and an engaged position in a paired position of the two frames (8, 9; 150, 151), transmission members (58, 59, 62, 63) for respectively connecting said coupling members (50, 51) to the power take-off (2) of the vehicle (1) and to a driven shaft (4) of the tool (3), said hitching device being characterized in that:
said coupling members (50, 51) are respectively mounted on the hitching frame (8; 150) and on the hitched frame (9; 151) so as to be:
movable in translation along a vertical axis (z) extending in an at least substantially vertical direction in a position of the frame (8, 9; 150, 151) where the joining face (8a, 9a) of said frame lies in a plane that is at least substantially vertical, and
freely rotatable about a transverse axis (y) forming an orthogonal coordinate system with the longitudinal axis (x) and the vertical axis (z),
prepositioning means (104-108, 122-125; 170) for positioning each of said coupling members (50, 51) along the vertical axis (z), said prepositioning means adapted for:
maintaining, when said coupling members (50, 51) are in the disengaged position, each of said coupling members in a predetermined position along the vertical axis (z) that is adapted to permit their engagement in the paired position of the two frames (8, 9; 150, 151), and
allowing, when said coupling members (50, 51) are in the engaged position, displacements of said coupled coupling members along the vertical axis (z), and tilting of said coupling members about the transverse axis (y),
the transmission members comprise, associated with each coupling member (50, 51), a transmission shaft (58, 59) of freely variable length, provided with a hinge member (62, 63) for respective connection to the power takeoff (2) of the vehicle (1) and to the driven shaft (4) of the tool (3), each transmission member integral with an associated coupling member (50, 51).

2. The hitching device according to claim 1, wherein the prepositioning means comprises elastic means (105, 107, 122, 124; 170) mounted on each frame (8, 9; 150, 151) and arranged to maintain each coupling member (50, 51) in a predetermined position along the vertical axis (z), prepositioning said coupling member, and to deform elastically in order to permit movement of the coupling members (50, 51) along the vertical axis (z) when in the coupling members' engaged position.

3. The hitching device according to claim 2, further comprising interchangeable spacer means (108, 125) adapted to be interposed, along the vertical axis (z), between each frame (8, 9) and the elastic means (105, 107, 122, 124; 170) for prepositioning each coupling member (50, 51), in order to adjust an initial prepositioning height of said each coupling member.

4. The hitching device according to one of claims 1-3, wherein each coupling member (50, 51) is mounted so as to rotate within a supporting block (70, 86, 110; 186, 189, 195, 198), at least one of said supporting blocks (70, 86; 186, 189, 195, 198) being divided into a fixed support (86; 189, 198) that is fixed in translation along the longitudinal axis (x) and a movable support (70; 186, 195) that is movable in translation along the longitudinal axis (x), each coupling member (50, 51) rotatably mounted within an associated supporting block, the means for relative displacement of the coupling members (50, 51) consisting of means (89; 192, 199) for translational movement of each of said movable supports.

5. The hitching device according to claim 4, wherein both supporting blocks (186, 189, 195, 198) are divided into a fixed support (189, 198) that is fixed in translation along the longitudinal axis (x) and a movable support (186, 195) that is movable in translation along the longitudinal axis (x), the means for relative displacement of the coupling members (50, 51) comprising:
a fluid actuator (192) for moving the movable support (186) of the supporting block of the coupling member (50) mounted on the hitching frame (150), and
elastic means (199) positioned between the fixed support (198) and the movable support (195) of the supporting block of the coupling member (51) mounted on the hitched frame (151).

6. The hitching device according to claim 4, wherein only the supporting block (70, 86) of the coupling member mounted on the hitching frame is divided into a fixed support (86) that is fixed in translation along the longitudinal axis (x) and a movable support (70) that is movable in translation along the longitudinal axis (x), the means for relative displacement of the coupling members (50, 51) comprising a fluid actuator (89) associated with a fluid accumulator.

7. The hitching device according to claim 4, wherein each coupling member (50, 51) is mounted so as to rotate freely about a vertical axis (z) relative to the corresponding frame (8, 9; 150, 151).

8. The hitching device according to claim 7, wherein each supporting block (70, 86, 110; 186, 189, 195, 198) is mounted so as to rotate freely about one of the vertical axis (z) or transverse axis (y) within an annular housing (94, 115; 179) that is movable in translation along a vertical axis (z) and that is freely rotatable about the second of the transverse axis (y) or vertical axis (z) relative to the corresponding frame (8, 9; 150, 151).

9. The hitching device according to claim 8, wherein each coupling member (50, 51) is mounted so as to move freely in translation along a transverse axis (y) relative to the corresponding frame (8, 9; 150, 151), said frame comprising elastic means (101, 117; 175, 176) arranged on each side of said each coupling member along the transverse axis (y), so as to maintain it in a substantially centered position relative to the frame (8, 9; 150, 151) in the absence of transverse stresses.

10. The hitching device according to claim 9, wherein:
each supporting block (186, 189, 195, 198) is mounted so as to rotate freely about a transverse axis (y) inside the annular housing (179),
each annular housing (179) is mounted so as to rotate freely about a vertical axis (z) relative to two pivot pins (177, 178) that are:
each free to move in translation along a crosspiece (171) of a framework (167) provided with uprights (168, 169) slidably mounted on columns (165, 166) extending along vertical axes (z), which are integral with the corresponding frame (150, 151), and
maintained in a centered position between the two uprights (168, 169) by springs (175, 176) arranged around crosspieces (171) on either side of said pivot pins.

11. The hitching device according to claim 10, further comprising means for maintaining the supporting block (195, 198) of the coupling member (51) mounted on the hitched frame (151) in a stable position at least substantially centered with respect to the longitudinal axis (x), in the disengaged position of said coupling member, said maintaining means comprising:

an assembly that is movable along the longitudinal axis (x) relative to the supporting block (195, 198), rotatably connected to said supporting block, and comprising, arranged on either side of the annular housing (179) and connected by longitudinal connecting members (202, 203), a retractable front piece (201) arranged so that it is pushed by the coupling member (50) mounted on the hitching frame (150) when the hitching frame is moved toward the engaged position of the coupling members (50, 51), and a stop plate (205) arranged to adjoin and abut against the annular housing (179) and to prevent the movable assembly and the supporting block (195, 198) from pivoting relative to said annular housing when said coupling members (50, 51) are in the disengaged position, the stop plate arranged to be spaced apart from the annular housing (179) by a distance allowing the supporting block (195, 198) to pivot when said coupling members (50, 51) are in the engaged position, and an elastic member (204) arranged so as to bias the movable assembly (201-203, 205) toward a position of rotational stabilization of the supporting block (195, 198) relative to the annular housing (179), and to allow the movement of said movable assembly upon movement of the coupling member (50) mounted on the hitching frame (150) toward the engaged position of said coupling members (50, 51).

12. The hitching device according to claim 11, wherein the retractable front piece (201) is arranged to be maintained, by the elastic member (204) arranged so as to bias the movable assembly (201-203, 205), in a position away from the movable support (195) of the supporting block (195, 198) of the coupling member (51) mounted on the hitched frame (151), and to be pushed into a stop position against said movable support.

13. The hitching device according to claim 9, wherein:
each supporting block (70, 86, 110) is mounted so as to rotate freely about a vertical axis (z) inside of the annular housing (94, 115),
each annular housing (94, 115) comprises two coaxial support shafts (99, 100, 116) mounted so as to rotate freely about a transverse axis (y) relative to the corresponding frame (8, 9), extending laterally along the same transverse axis (y) on either side of said annular housing, and a spring (101, 117) around each annular housing for biasing the annular housing (94, 115) toward a substantially centered position relative to the frame (8, 9).

14. The hitching device according to claim 13, wherein each annular housing (94, 115) is arranged in a framework (95, 118) provided with uprights (96, 119) each having a rotatably mounted support shaft (99, 100, 116) for said annular housing, said uprights being mounted so as to slide along rails (25, 26, 47) extending along vertical axes (z) that are integral with the corresponding frame (8, 9).

15. The hitching device according to claim 14, wherein the coupling members (50, 51) consist of coupling members which engage by dog clutching, provided with fool-proofing.

16. The hitching device according to claim 15, wherein the coupling members (50, 51) are in the form of coupling rings (52, 53) having a front face (52a, 53a) in which coupling teeth (64-66) are provided.

17. The hitching device according to claim 16, wherein:
the retractable front piece consists of a male or female centering cone (201) having a base adapted to surround the coupling ring (53) of the coupling member (51) mounted on the hitched frame (151), and
the coupling member (50) mounted on the hitching frame (150) comprises a complementary female or male centering cone (188) having a base surrounding the coupling ring (52) of the coupling member (50) mounted on the hitching frame (150) adapted to engage with and push against the centering cone (201) of the hitched frame (151).

18. The hitching device according to claim 16, further comprising an external centering cone (82) having a base (81) surrounding the coupling ring of one of the coupling members (50, 51), adapted to externally guide and center the other coupling member during engagement of said coupling members.

19. The hitching device according to claim 18, wherein:
the coupling ring of one of the coupling members (50, 51) has a central region into the axial extension of which extends an internal centering cone (83), and
the other coupling ring has a hollow central region (130, 131) defining a longitudinal bore of conical shape that will mate with the internal centering cone (83), adapted for guiding and centering.

20. The hitching device according to claim 19, wherein the internal centering cone (83) comprises a cylindrical base (84) which extends from the associated coupling ring, adapted to form a cylindrical bearing surface for a cylindrical end portion (131) of the bore (130, 131) defined by the other coupling ring.

21. The hitching device according to claim 16, wherein each transmission shaft (58, 59) is a telescopic shaft composed of two telescopic elements comprising:
a male element (60, 61), equipped with a hinge member (62, 63) for the respective connection to the power take-off (2) of the vehicle (1) and to the driven shaft (4) of the tool (3), and
a female element (50, 51) forming each coupling member.

22. The hitching device according to claim 21, wherein:
each telescopic male element consists of a splined shaft (60, 61), and
each telescopic female element consists of a fluted sleeve (50, 51).

* * * * *